(12) United States Patent
Jeffries

(10) Patent No.: US 12,466,325 B2
(45) Date of Patent: Nov. 11, 2025

(54) BIN SYSTEM

(71) Applicant: Austin Hardware & Supply, Inc., Lee's Summit, MO (US)

(72) Inventor: Mark Steven Jeffries, Buford, GA (US)

(73) Assignee: Austin Hardware & Supply, Inc., Lee's Summit, MO (US)

( * ) Notice: Subject to any disclaimer, the term of this patent is extended or adjusted under 35 U.S.C. 154(b) by 63 days.

(21) Appl. No.: 18/227,004

(22) Filed: Jul. 27, 2023

(65) Prior Publication Data

US 2024/0034241 A1    Feb. 1, 2024

Related U.S. Application Data

(60) Provisional application No. 63/394,095, filed on Aug. 1, 2022.

(51) Int. Cl.
| | | |
|---|---|---|
| *B60R 7/08* | (2006.01) | |
| *B60R 7/02* | (2006.01) | |
| *B65D 25/06* | (2006.01) | |
| *B65D 25/22* | (2006.01) | |
| *B65D 25/28* | (2006.01) | |

(52) U.S. Cl.
CPC ............ *B60R 7/08* (2013.01); *B60R 7/02* (2013.01); *B65D 25/06* (2013.01); *B65D 25/22* (2013.01); *B65D 25/2852* (2013.01)

(58) Field of Classification Search
CPC ...... B62J 9/27; B60R 2011/0078; B60R 7/08; B60R 11/00; B60R 9/00; B60R 7/00; B60R 7/02; G01D 11/305; G01D 11/30; B65D 25/22; B65D 25/06; B65D 25/2852; A45C 2009/005; A45F 5/00
See application file for complete search history.

(56) References Cited

U.S. PATENT DOCUMENTS

| | | | | |
|---|---|---|---|---|
| 8,028,877 B2 * | 10/2011 | Lien | ........................... | B62J 9/27 224/419 |
| 11,608,134 B2 * | 3/2023 | Ortlieb | ...................... | B62J 7/04 |
| 2010/0108729 A1 * | 5/2010 | Golub | ........................ | B62J 7/08 224/419 |
| 2010/0156131 A1 * | 6/2010 | D'Alessandro | ........... | B60R 7/04 296/37.8 |
| 2011/0073627 A1 * | 3/2011 | Lida | ........................... | B62J 7/04 224/413 |
| 2015/0344089 A1 * | 12/2015 | Bopanna | ................ | H01F 7/0252 224/430 |
| 2020/0339208 A1 * | 10/2020 | Inose | ........................ | B62J 9/27 |

* cited by examiner

*Primary Examiner* — Shawn M Braden
(74) *Attorney, Agent, or Firm* — Polsinelli PC

(57) ABSTRACT

A bin system is described for use on emergency vehicles, such as ambulances, fire trucks, etc. is described. The bin system includes a bin that securely mounts to brackets on a wall of the vehicle. The bin is formed using tie rods, which also engage the brackets. A handle of the bin further engages to the brackets to securely hold the bin to the brackets.

20 Claims, 24 Drawing Sheets

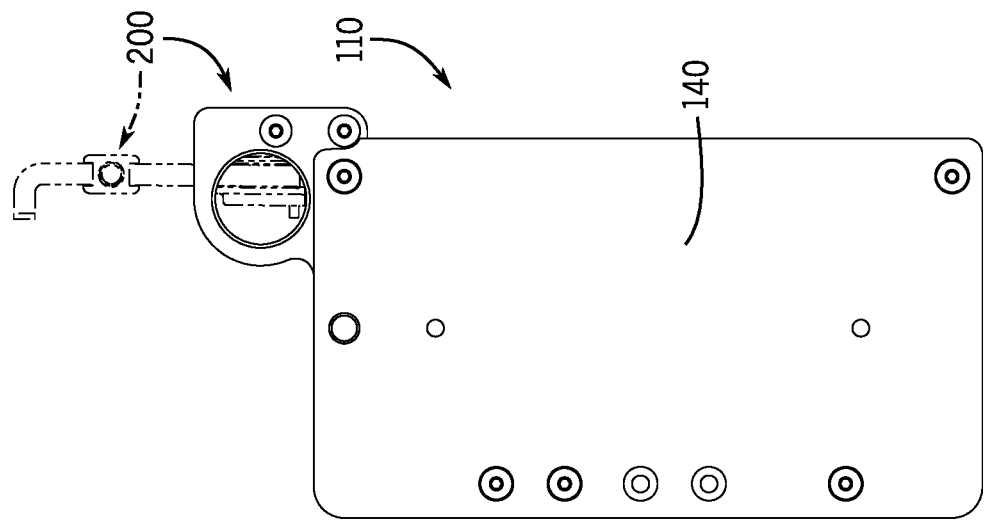
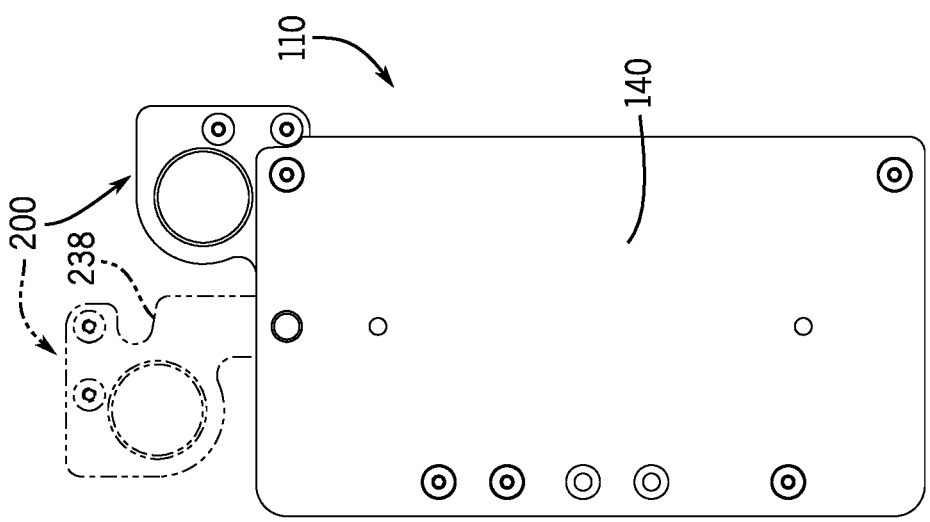

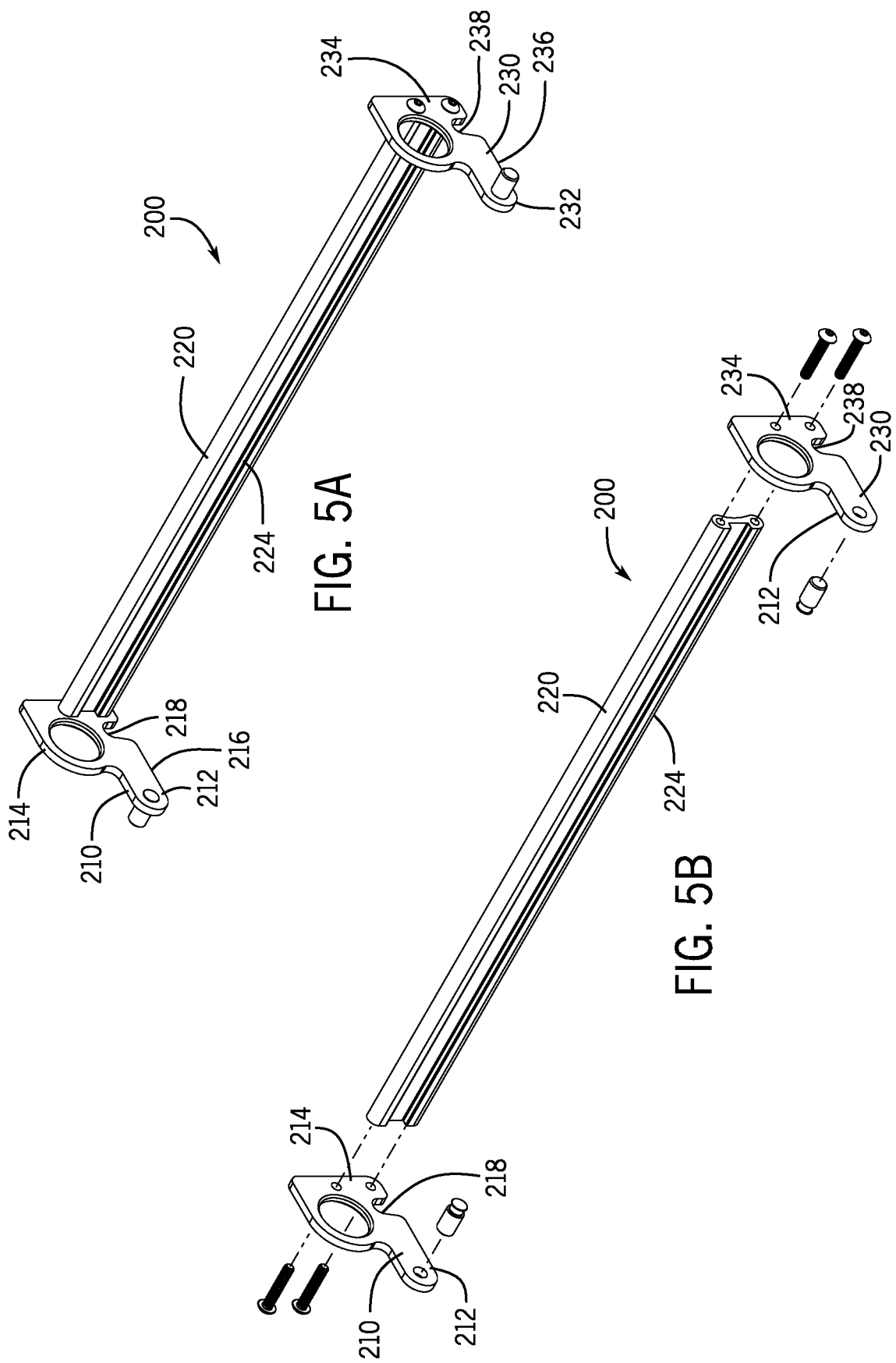

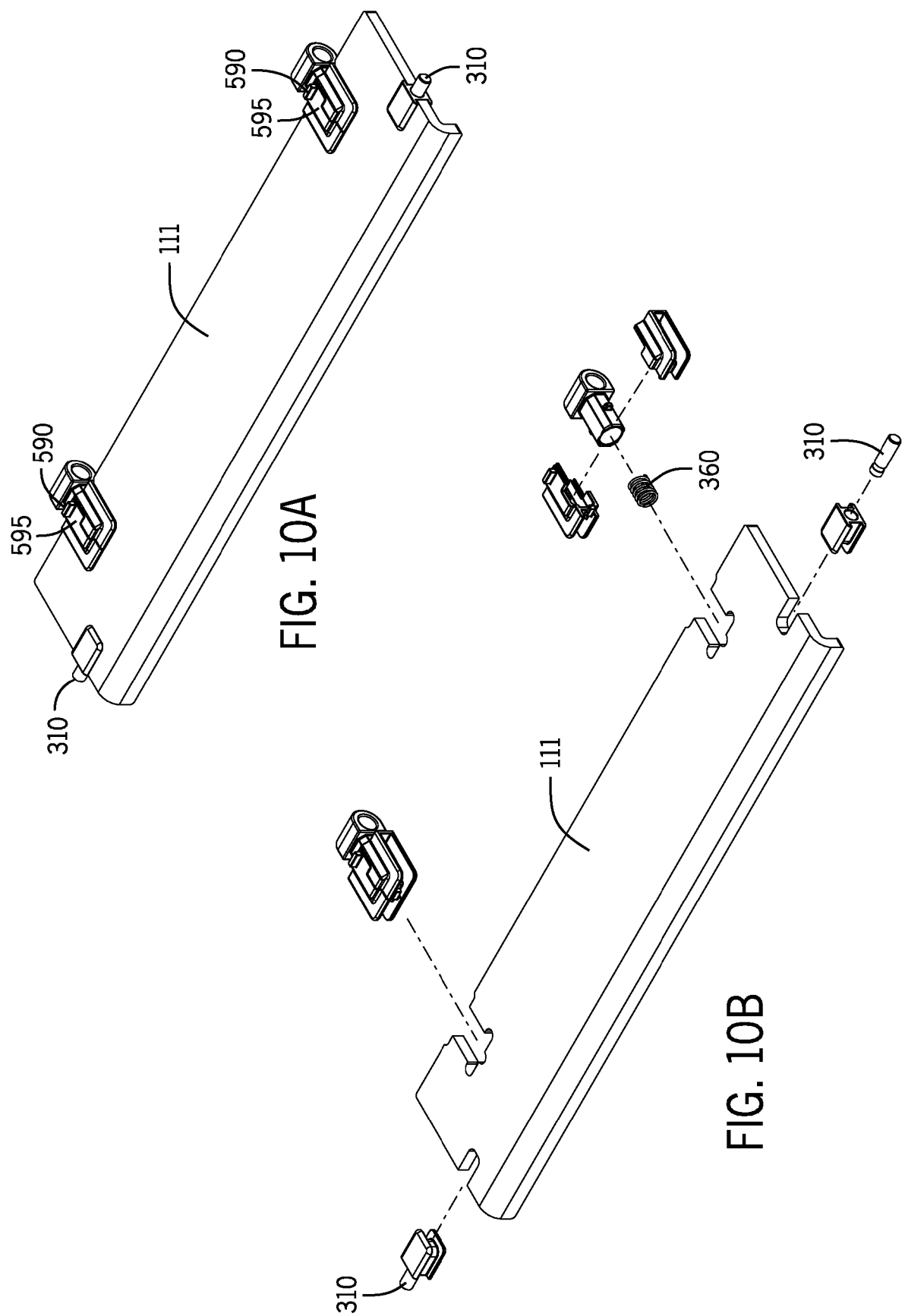

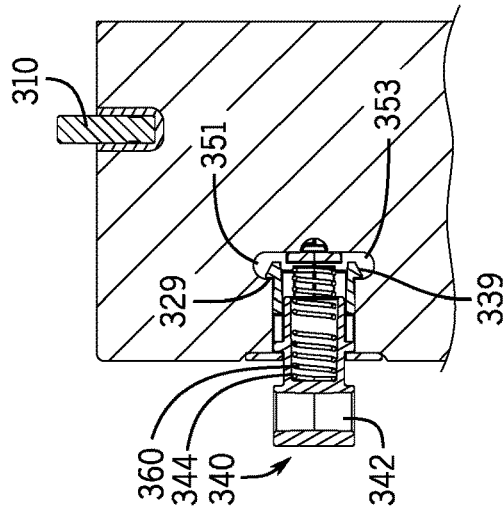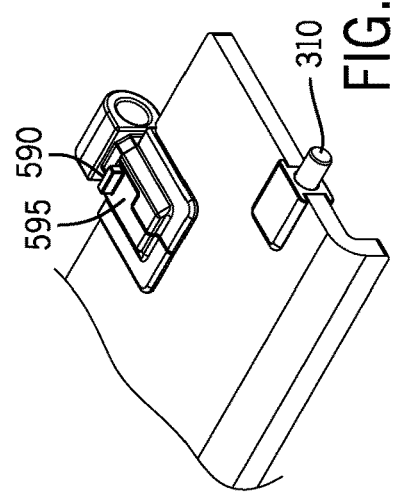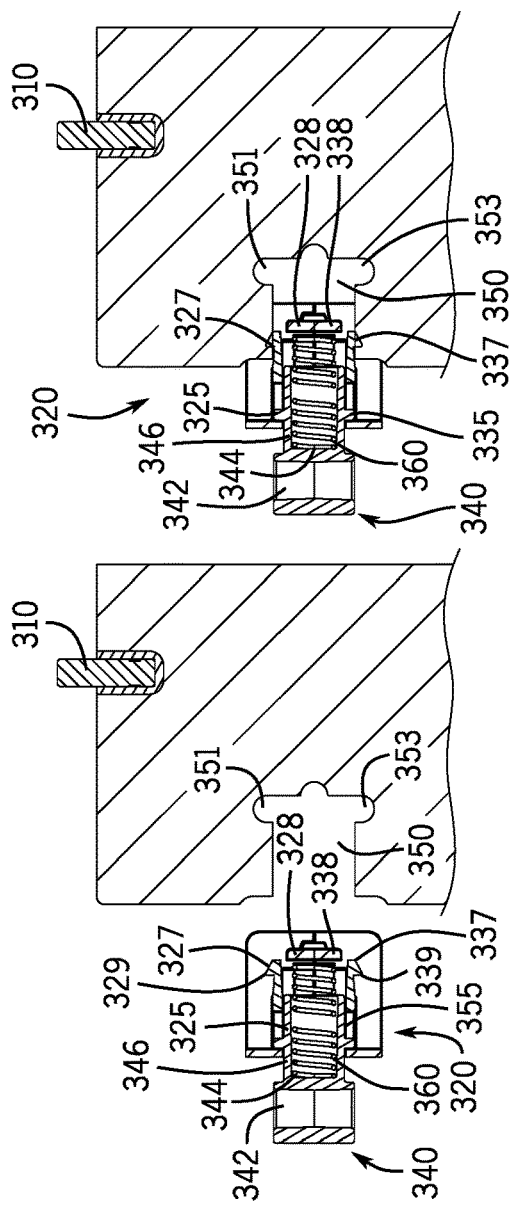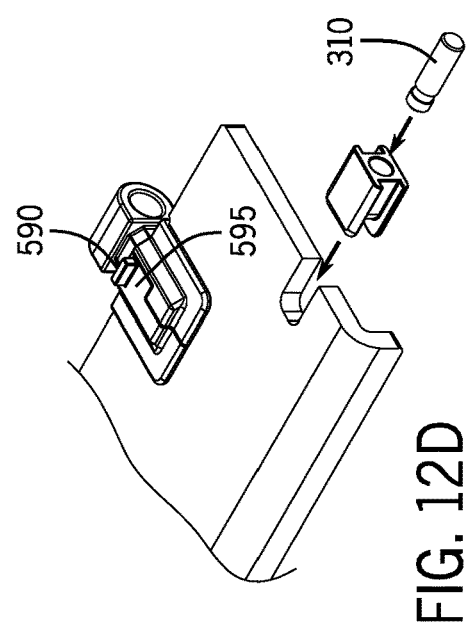

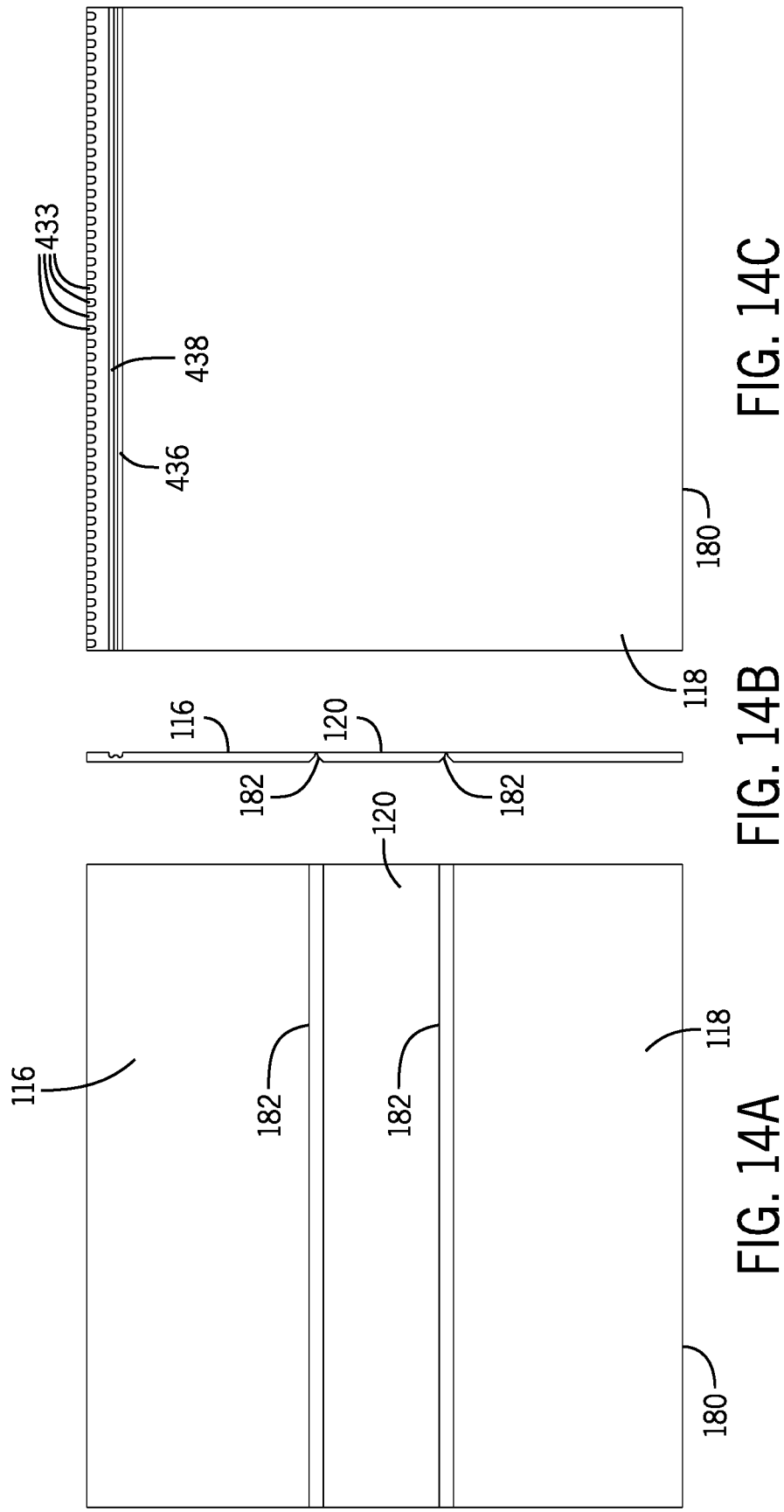

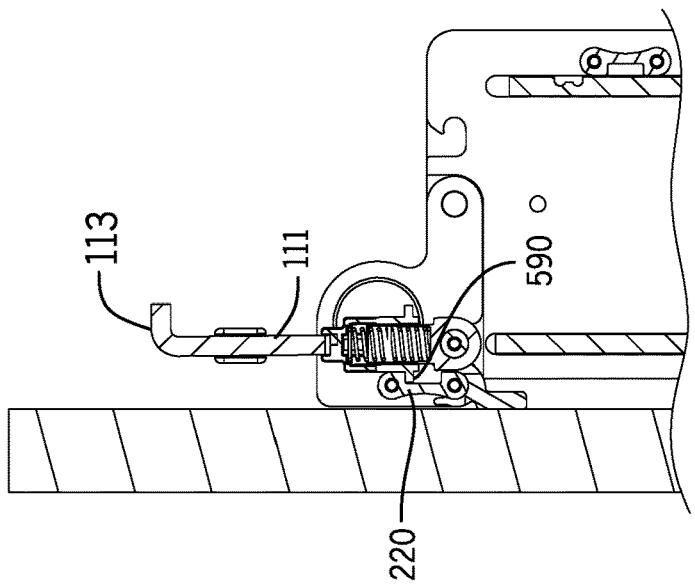
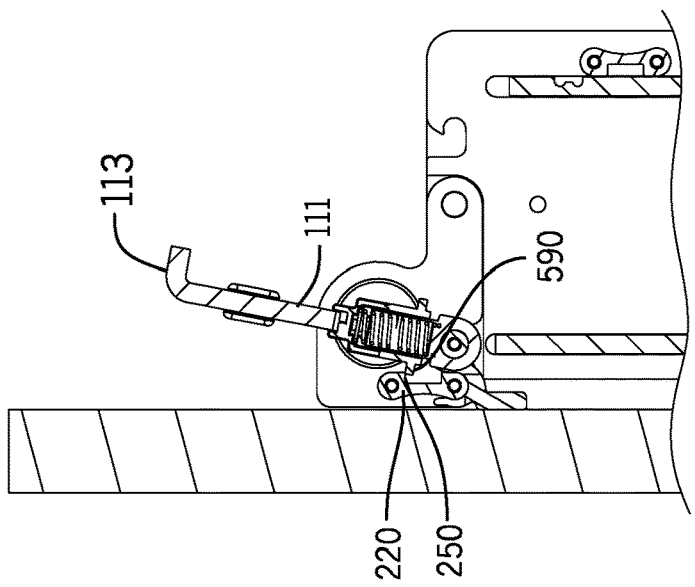
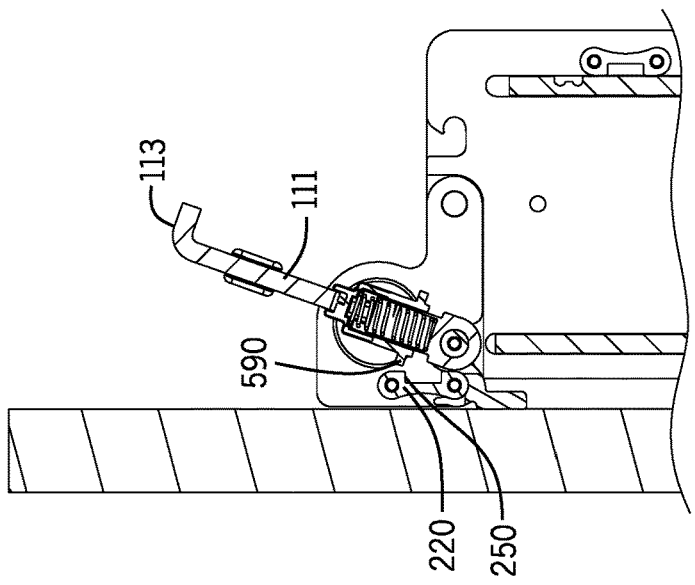

BIN SYSTEM

This application claims priority to U.S. Provisional Patent Application No. 63/394,095 filed Aug. 1, 2022, which is hereby incorporated by reference in its entirety.

FIELD OF INVENTION

The present invention relates to a bin system.

BACKGROUND OF INVENTION

Current bin systems on emergency vehicles, such as ambulances, do not have lids, and when a crash occurs, the contents of the bin may come out of the bin and hit a patient or emergency worker. Typical bins on emergency vehicles are glued together, and the glued joints are prone to break apart. Current bins are permanently attached to a wall of the ambulance and cannot be removed for re-stocking. Current bins have pre-defined bin sizes that cannot be changed or re-organized.

SUMMARY

The bin system is well suited for use on emergency vehicles, such as ambulances, fire trucks, etc. The bin system may be securely locked to a wall in a bay of the ambulance, fire truck, etc. A bin of the bin system may be readily removed from the wall for restocking or replacement with a second bin. The bin is configured to securely hold medical supplies and equipment and is crash-resistant. The bin includes a handle that provides a carrying function and a locking function.

In one aspect, a bin system is described. The bin system includes a bin. A handle assembly is rotatably engaged to the bin. The bin includes a first tie rod and a second tie rod. The bin system includes an upper bracket and a lower bracket. The upper bracket and the lower bracket are configured to mount to walls or other structures. The second tie rod is configured to engage to the lower bracket. The first tie rod is configured to engage to the upper bracket. The handle assembly is configured to engage to the upper bracket. When the handle assembly engages to the upper bracket, the bin is locked into place on the upper bracket and the lower bracket.

In another aspect, a bin is described. The bin includes a box portion having a front portion, a rear portion, and a bottom portion. The box portion defines an interior. A first lateral end block is joined to the box portion. A second lateral end block is joined to the box portion. A handle assembly is rotatably engaged to the box portion. A divider wall is adjustably engaged in the interior of the box portion. A positioner clip engages the box portion and the divider wall. The positioner clip is configured to slide relative to the front portion.

In another aspect, a bin is described. The bin includes a box portion, a first lateral end block, and a second lateral end block. A first groove is formed in an interior surface of the first lateral end block. The first groove receives a first lateral side of the box portion. A second groove is formed in an interior surface of the second lateral end block. The second groove receives a second lateral side of the box portion. A handle assembly is rotatably engaged to the bin. Tie rods secure the box portion, the first lateral end block, and the second lateral end block together to form the bin.

In another aspect, a bin is described. The bin includes a box portion, a first lateral end block, and a second lateral end block. A handle assembly is rotatably engaged to the first lateral end block and the second lateral end block. A lid is rotatably engaged to the bin by a hinge assembly. The lid is configured to rotate between open and closed configurations. A hinge assembly biases or urges the lid outward or forward. In the closed configuration, lid pins are held or trapped in openings in the first lateral end block and the second lateral end block to hold the lid closed.

In another aspect, a bin system is described. The bin system includes a bin. A handle assembly is rotatably engaged to the bin. The bin includes a first lateral rod and a second lateral rod. The bin system includes an upper bracket and a lower bracket. The second lateral rod is configured to engage to the lower bracket. The first lateral rod is configured to engage to the upper bracket. The handle assembly is configured to engage to the upper bracket. The lateral rods may be positioned on a rear surface of the bin. The lateral rods may be separate components from the bin that are fastened to the bin. The lateral rods may extend less than a length or width of the bin.

BRIEF DESCRIPTION OF DRAWINGS

FIG. 2A is a side view of the bin.
FIG. 2B is a side view of the bin.
FIG. 5A is a perspective view of the handle assembly.
FIG. 5B is an exploded view of the handle assembly.
FIG. 10A is a perspective view of the lid.
FIG. 10B is an exploded view of the lid.
FIG. 12A is a view of the lid and the hinge.
FIG. 12B is a view of the lid and the hinge.
FIG. 12C is a view of the lid and the hinge.
FIG. 12D is a view of the lid and the hinge.
FIG. 12E is a view of the lid and the hinge.
FIG. 14A is a front view of the material forming the box before bending.
FIG. 14B is a side view of the material forming the box before bending.

FIG. 14C is a rear view of the material forming the box before bending.

FIG. 24A is a side sectional view of the bin with the lid in the open position.

FIG. 24B is a side sectional view of the bin with the lid in the open position.

FIG. 24C is a side sectional view of the bin with the lid in the open position.

DETAILED DESCRIPTION OF INVENTION

Figure 1:
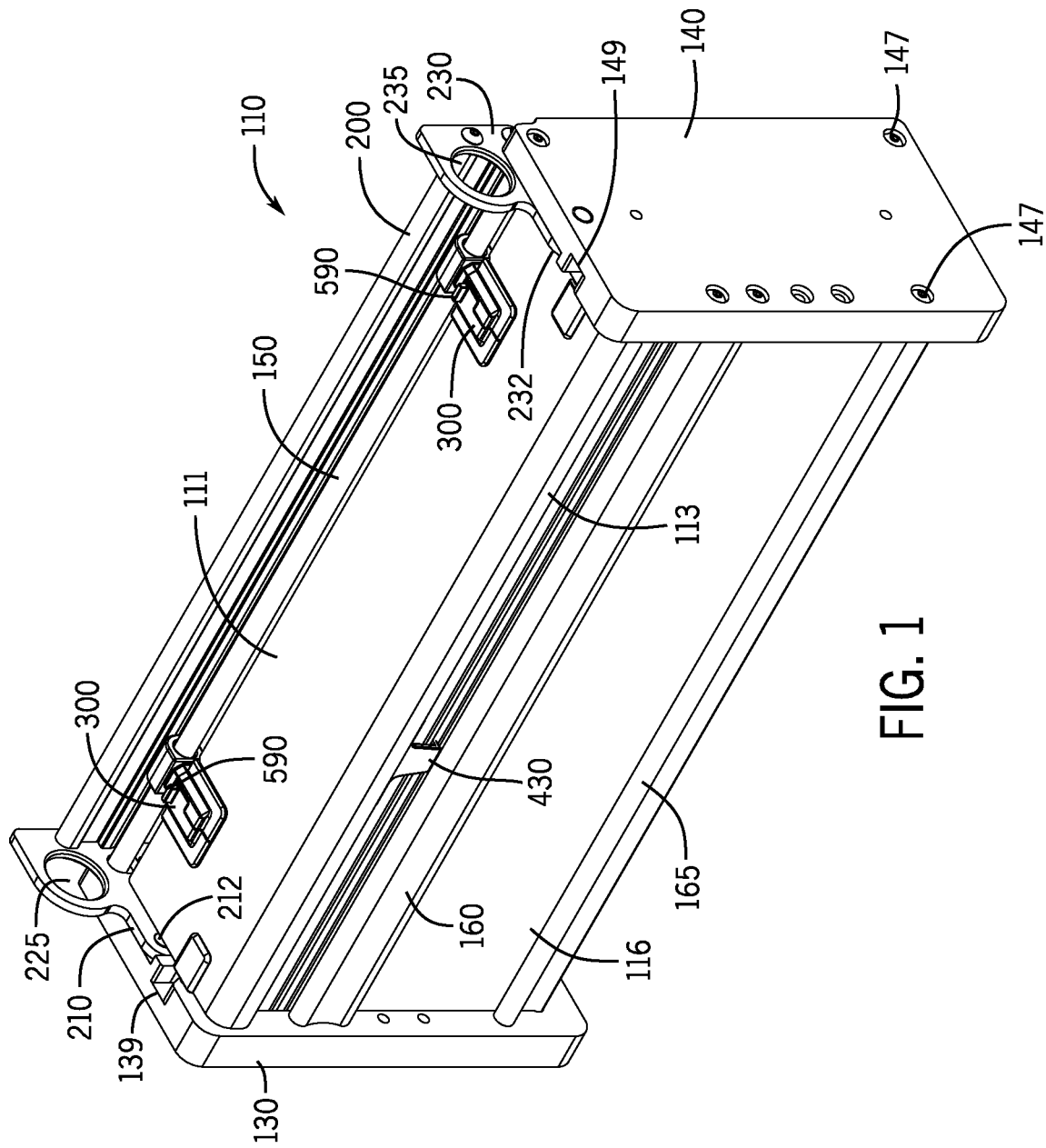
FIG. 1 is a perspective view of the bin.
Figure 3C:
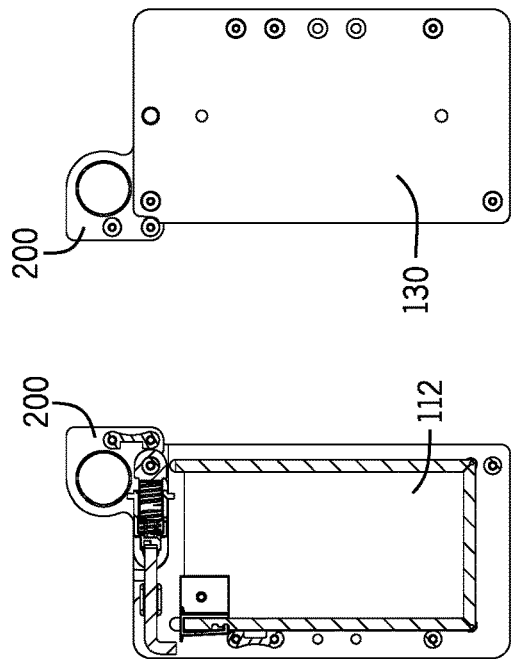
FIG. 3C is a side view of the bin.
Figure 3E:
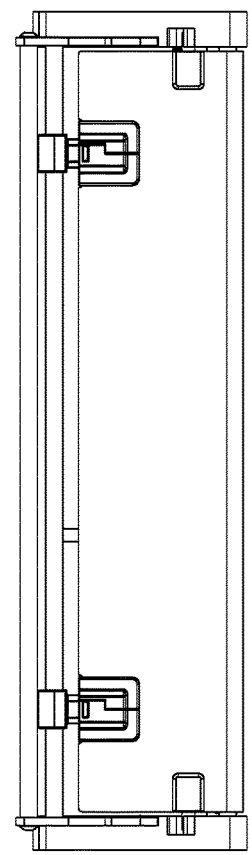
FIG. 3E is a top view of the bin.
Figure 3B:
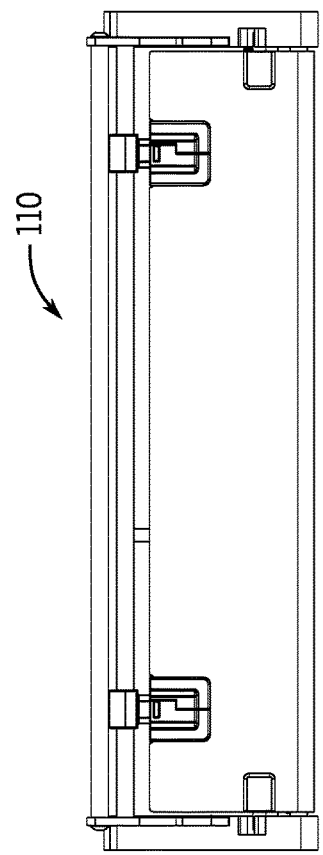
FIG. 3B is a side sectional view of the bin.
Figure 3A:
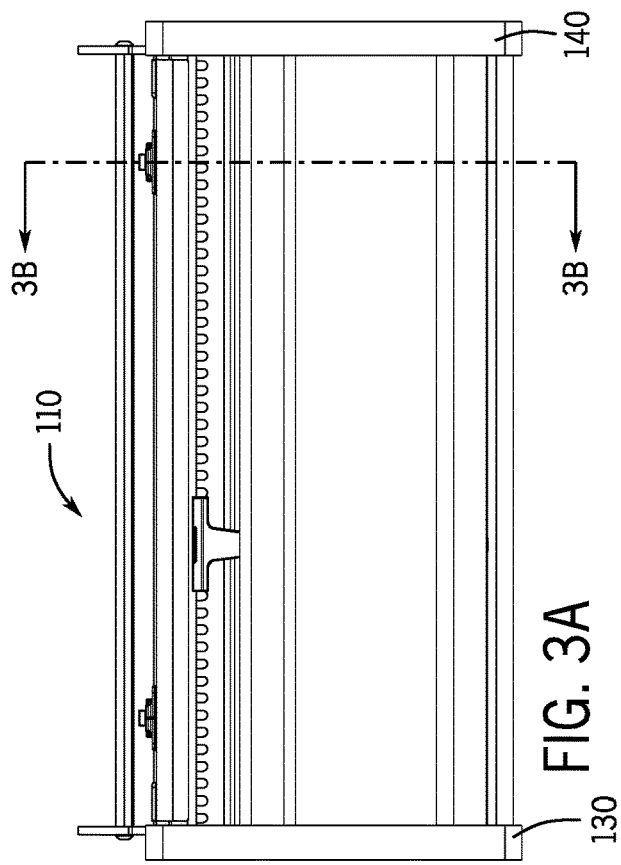
FIG. 3A is a front view of the bin.
Figure 3D:
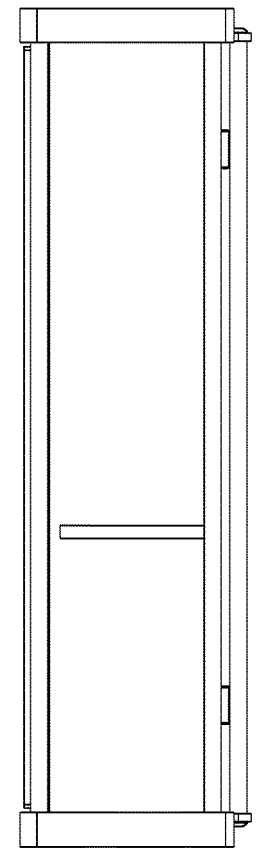
FIG. 3D is a bottom view of the bin.

For purposes of this application, any terms that describe relative position (e.g., "upper", "middle", "lower", "outer", "inner", "above", "below", "bottom", "top", etc.) refer to an embodiment of the invention as illustrated, but those terms do not limit the orientation in which the embodiments can be used.

A bin system 100 will now be described with reference to FIGS. 1-24. The bin system 100 includes a bin 110. The bin 110 includes a lid 111 that is hingedly or rotatably engaged to the bin 110. The bin 110 include a generally open interior 112 to hold any of a variety of items. The lid 111 covers an opening to the generally open interior 112 of the bin 110. A front portion 113 of the lid 111 may include a bend or an angled portion that provides a surface for the user to grab or grip while opening the lid 111.

The bin system 100 may be installed on walls of emergency vehicles, such as ambulances, fire trucks, etc. The bin system 100 provides for secure and safe storage for items that are placed in the bin 110, as the bin system 100 is generally crash resistant.

The bin 110 includes a handle assembly 200 that provides a carrying function and a locking function. The handle assembly 200 is rotatably engaged to the bin 110. The handle assembly 200 is configured to rotate between a locking configuration and a carrying configuration. As further described below, the bin 110 mounts to an upper bracket 500 and a lower bracket 550, which are fastened or mounted to a wall 40 of the ambulance. Next, the handle assembly 200 rotates toward the wall 40 and engages to the upper bracket 500. Once the handle assembly 200 engages the upper bracket 500, the bin 110 is securely fastened to the wall 40, and the bin 110 is not readily removable until the handle assembly 200 is disengaged from the upper bracket 500. In the carrying configuration, the handle assembly 200 may rotate to a position or location over an upper opening of the bin 110

In this aspect, the bin 110 includes a box portion 114, a first lateral end block 130, and a second lateral end block 140. In this aspect, the box portion 114 includes a front portion 116, a rear portion 118, and a bottom portion 120.

The handle assembly 200 includes a first arm 210 and a second arm 230. In this aspect, the first arm 210 and the second arm 230 are rotatably engaged to the box portion 114. In this aspect, a proximal side 212 of the first arm 210 is rotatably engaged to an inner surface of the first lateral end block 130, while a proximal side 232 of the second arm 230 is rotatably engaged to an inner surface of the second lateral end block 140. A support rod 220 joins inner surfaces of the first arm 210 and the second arm 230. The support rod 220 may extend a width or length of the box portion 114 and connect with the first arm 210 and the second arm 230. The support rod 220 may engage to distal sides 214 and 234 of the first arm 210 and the second arm 230, respectively. In this aspect, the support rod 220 includes a lower rounded surface 224.

In this aspect, the distal sides 214 and 234 of the first arm 210 and the second arm 230, respectively, may include openings 225 and 235. The openings 225 and 235 provide a gripping point for the user to pull the handle assembly 200 out of the locked position with respect to the upper bracket 500. In this aspect, the openings 225 and 235 include a circular shape. In other aspects the openings 225 and 235 may include an ovular, stadium, rectangular or other shape. In other aspects, pulls, knobs, or another secondary handle may be integral or attached to the handle assembly 200 to provide for convenience in pulling the handle assembly 200 out of the locked position.

A lower edge 216 of the first arm 210 includes an opening or indent 218 configured to fit over or partially receive a diameter of the first tie rod 150. Similarly, a lower edge 236 of the second arm 230 includes an opening or indent 238 configured to fit over or partially receive a diameter of the first tie rod 150. In the locking configuration of the handle assembly 200, the handle assembly 200 rotates towards a rear of the bin 110, and the openings 218 and 238 fit over or engage the diameter of the first tie rod 150. In the carrying configuration of the handle assembly 200, the handle assembly 200 may be rotated upward or away from the rear of the bin 110. A user may grasp their hand around the support rod 220 in order to conveniently carry the bin 110.

The box portion 114 may include a continuous "U" shaped or trough-shaped profile. The box portion 114 of the bin 110 may formed by routing and heat bending. For example, with reference to FIGS. 15-16, a sheet of material 180 is formed. Grooves or wedges 182 are routed, milled, or otherwise formed in the material 180. The wedges 182 are heated to soften the material 180 at the wedges 182, and then the front portion 116 and the rear portion 118 are bent upward from the bottom portion 120 to form the box portion 114. Thus, in this aspect, the front portion 116, the rear portion 118, and the bottom portion 120 are formed as an integral structure from the sheet of material 180.

Figure 4:
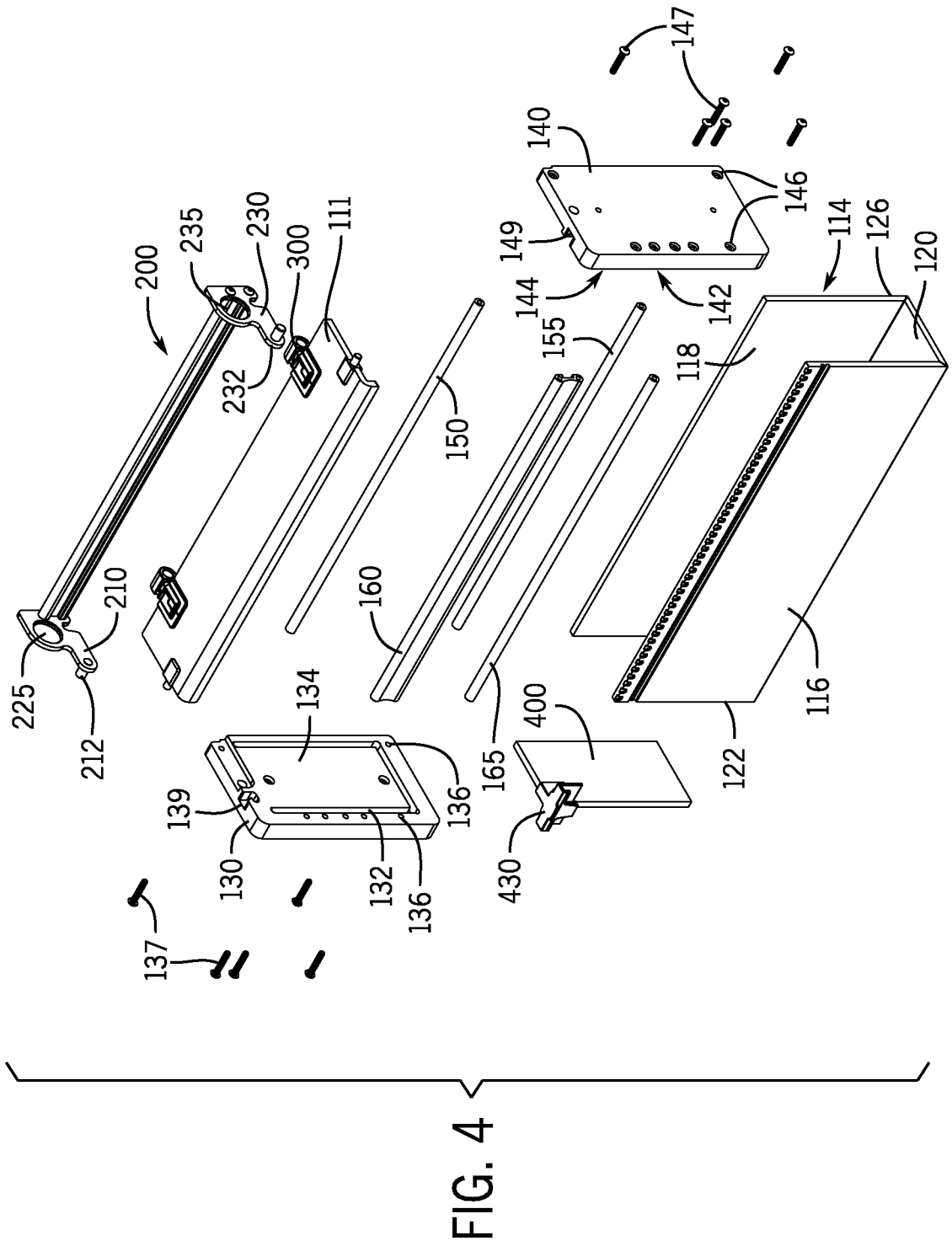
FIG. 4 is an exploded view of the bin.
Figure 6A:
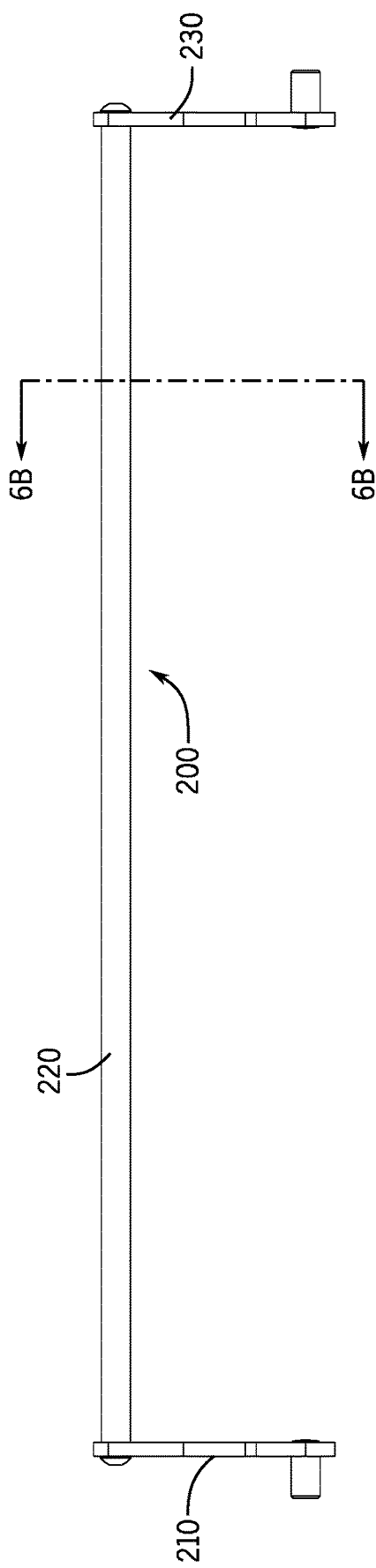
FIG. 6A is a top view of the handle assembly.
Figure 6B:
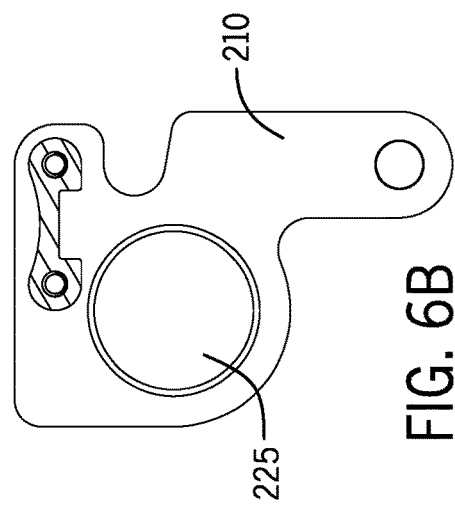
FIG. 6B is a sectional view of the handle assembly.
Figure 7A:
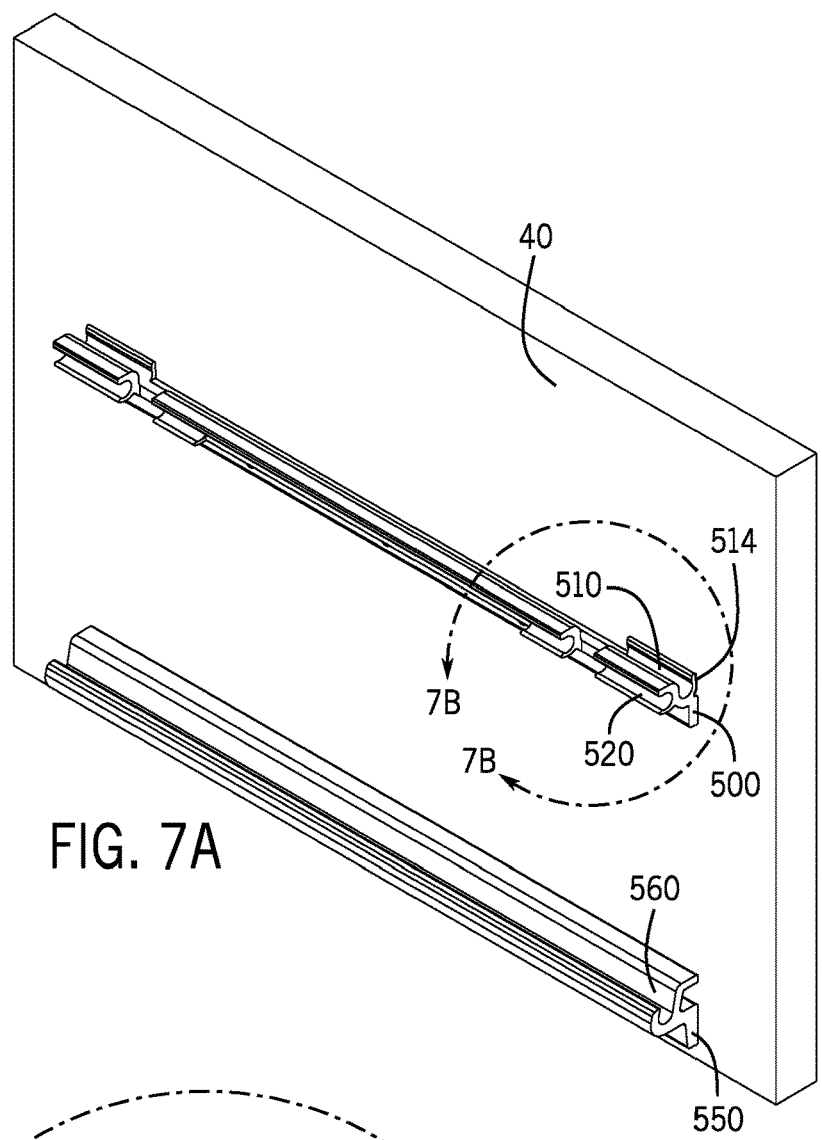
FIG. 7A is a perspective view of the bracket.
Figure 7B:
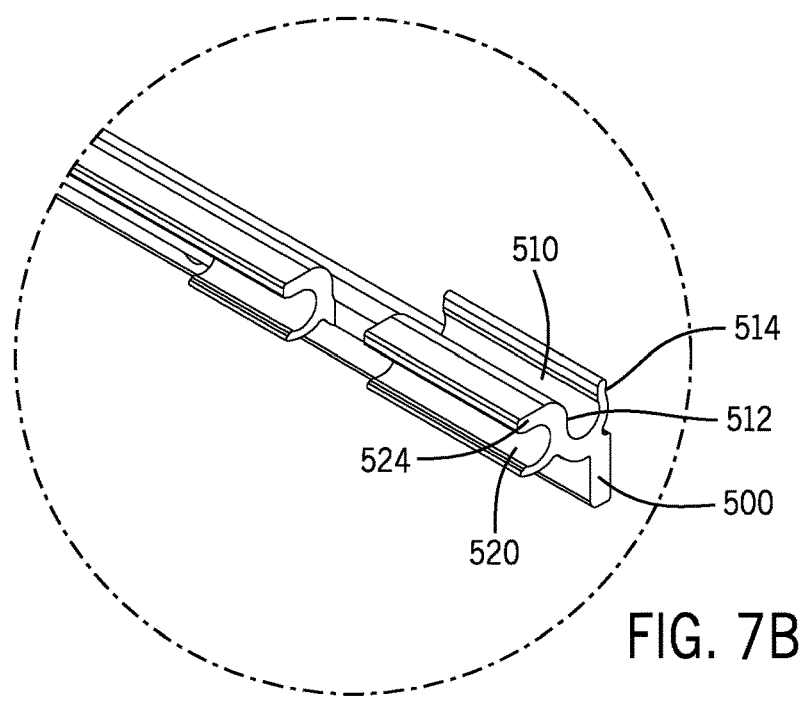
FIG. 7B is a close-up perspective view of the bracket.
Figure 8A:
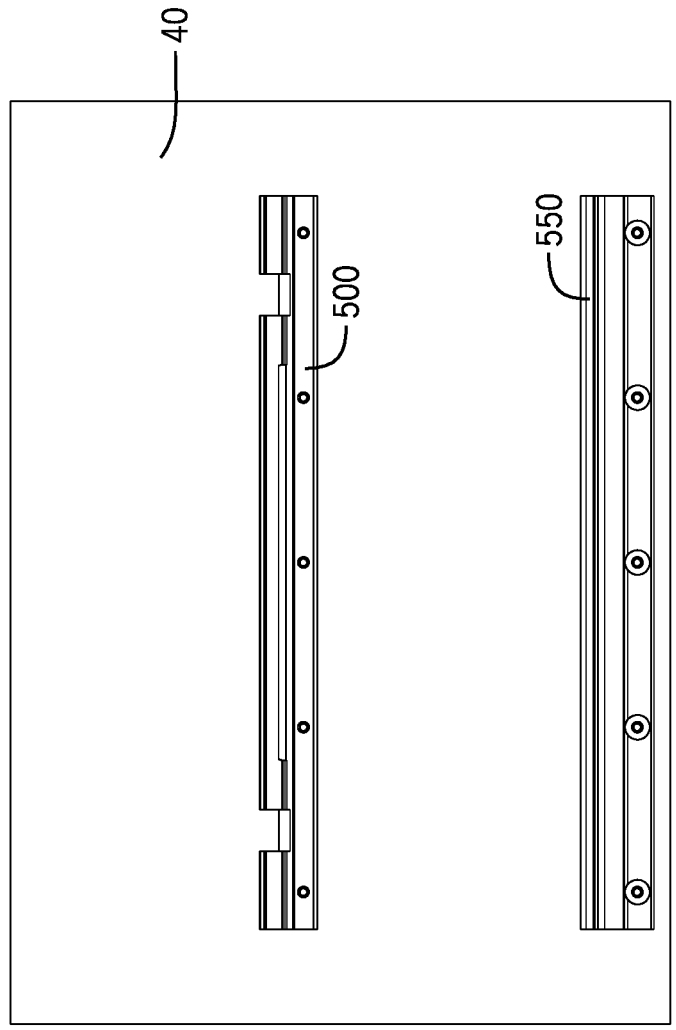
FIG. 8A includes fronts views of the brackets.
Figure 8B:
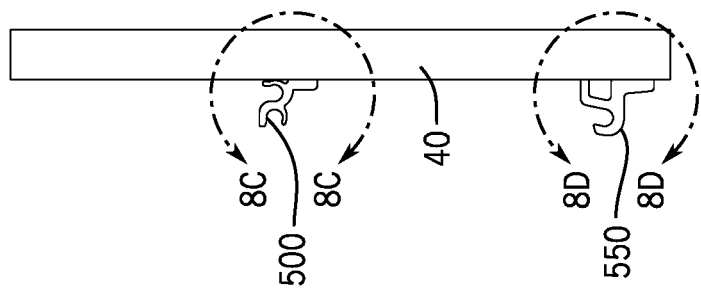
FIG. 8B includes side views of the brackets.
Figure 8C:
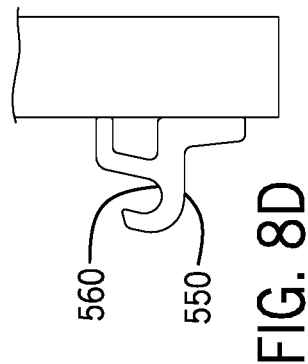
FIG. 8C is a side view of the upper bracket.
Figure 8D:
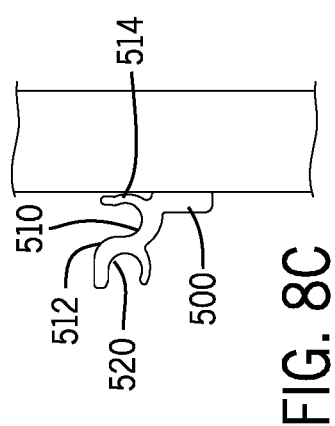
FIG. 8D is a side view of the lower bracket.
Figure 9D:
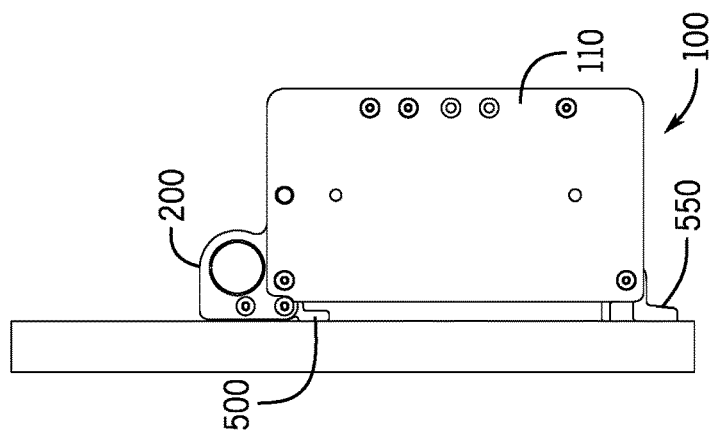
FIG. 9D is a view of the bin mounted to the brackets and the handle engaged.
Figure 9C:
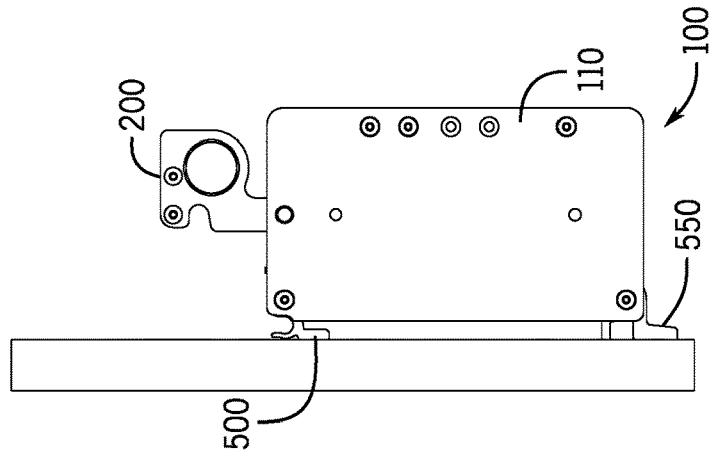
FIG. 9C is a view of the bin mounted to the upper and lower brackets.
Figure 9B:
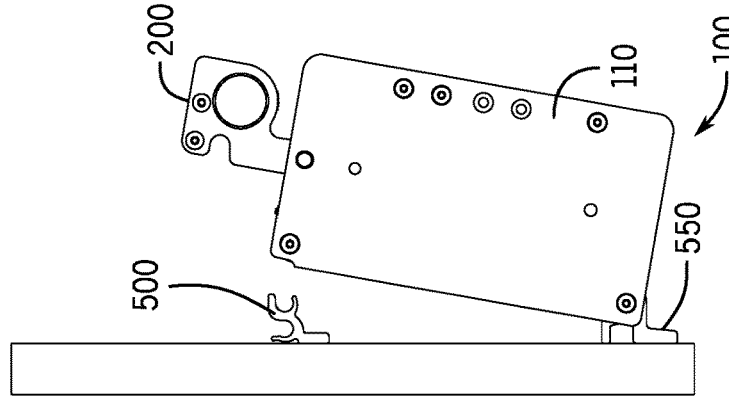
FIG. 9B is a view of the bin mounted to the lower bracket.
Figure 9A:
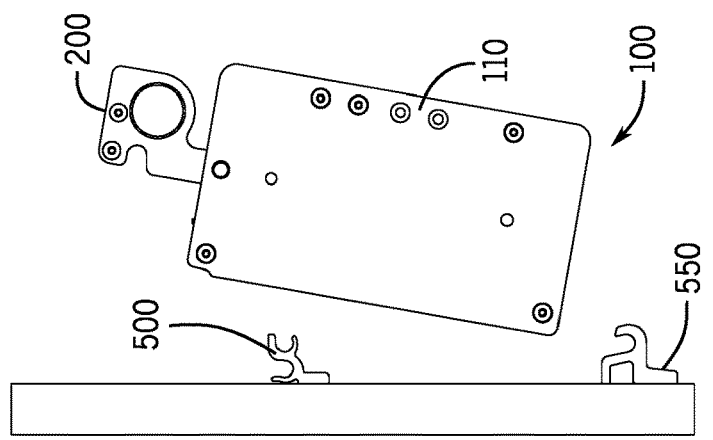
FIG. 9A is a view of the bin prior to mounting to the brackets.
Figure 11B:
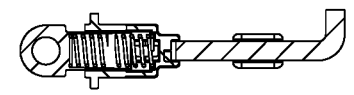
FIG. 11B is a sectional view of the lid.
Figure 11D:
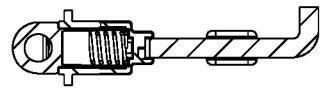
FIG. 11D is a sectional view of the lid.
Figure 11A:
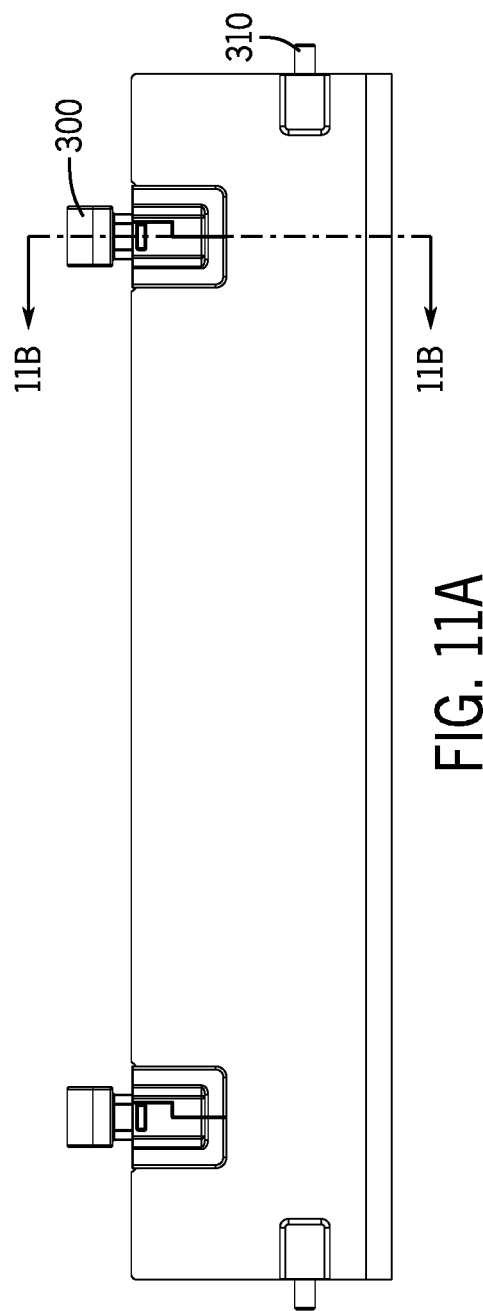
FIG. 11A is a top view of the lid.
Figure 11C:
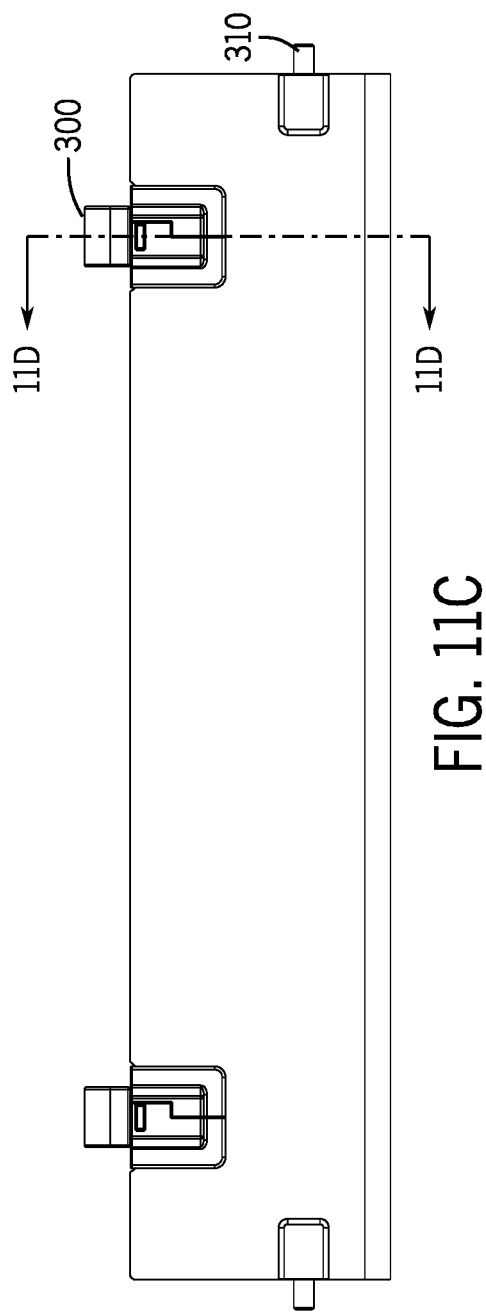
FIG. 11C is a top view of the lid.

The bin 110 includes the box portion 114, the first lateral end block 130, and the second lateral end block 140. The bin 110 may be formed by locking the box portion 114 into the first lateral end block 130 and into the second lateral end block 140 for increased strength. With reference to FIG. 4, a first groove 132 is formed in an interior surface 134 of the first lateral end block 130. The first groove 132 receives a first lateral side 122 of the box portion 114. Likewise, a second groove 142 is formed in an interior surface 144 of the second lateral end block 140. The second groove 142 receives a second lateral side 126 of the box portion 114. Respective lateral edges of the front portion 116, the rear portion 118, and the bottom portion 120 may insert or fit into the first groove 132 and the second groove 142.

The bin 110 may be securely formed without the use of adhesives. With respect to FIG. 4, in this aspect, the first tie rod 150, a second tie rod 155, a third tie rod 160, and a fourth tie rod 165 hold the box portion 114, the first lateral end block 130, and the second lateral end block 140 together. The first tie rod 150 is positioned on or along a rear of an upper portion of the bin 110. The second tie rod 155 is positioned on or along the rear of the lower portion of the bin 110. The third tie rod 160 is positioned on or along a front, middle portion of the bin 110. The fourth tie rod 165 is positioned on or along a front, lower portion of the bin 110. The tie rods 150, 155, 160, and 165 provide strength reinforcement and to improve crash resistance. In this aspect, the third tie rod 160 includes a double rod extrusion instead of a single rod. This provides for increased crash resistance. In other aspects, the tie rods 150, 155, 160, and 165 may extend a portion of the width of the bin 110 and not the entire width of the bin 110.

As described below in greater detail, the first tie rod 150 and the second tie rod 155 are also used in the locking or latching of the bin 110 to the wall 40 of the ambulance. In this aspect, the tie rods 150, 155, 160, and 165 are generally arranged parallel with the support rod 220 of the handle assembly 200. In this aspect, the tie rods 150, 155, 160, and 165 extend all of the distance between and connect the first lateral end block 130 and the second lateral end block 140.

The tie rods 150, 155, 160, and 165 extend a length or width of the bin 110. Openings 136 are formed in the first lateral end block 130, and openings 146 are formed in the second lateral end block 140. Fasteners 137 pass through the openings 136 and into first ends of the tie rods 150, 155, 160, and 165. Fasteners 147 pass through the openings 146 and into second ends of the tie rods 150, 155, 160, and 165.

One or more hinge assemblies 300 hingedly or rotatably engage the lid 111 to the first tie rod 150. In this aspect, two hinge assemblies 300 are utilized. In other aspects, a single hinge assembly 300 may be employed. Other types and styles of hinges may be used with the bin 110.

In this aspect, the hinge assemblies 300 include a spring-loaded feature that provides for a latching or locking feature of the lid 111 with respect to the bin 110. The spring-loaded feature of the hinge assemblies 300 biases or urges the lid 111 outward or forward, which traps lid pins 310 in openings 139 and 149 in the first lateral end block 130 and the second lateral end block 140. This engagement secures the lid 111 in a closed position. In other aspects, the lid 111 may be closed with mechanical latches, locks, and the like.

The spring-loaded features of the hinge assemblies 300 are shown in FIGS. 10-13. The hinge assembly 300 includes a lid connection assembly 320 and a tie rod connection portion 340. The lid connection assembly 320 connects or attaches to the lid 111, while the tie rod connection portion 340 connects or attaches to the first tie rod 150. In this aspect, the tie rod connection portion 340 includes an opening 342 configured to receive the first tie rod 150.

In this aspect, the lid connection assembly 320 includes a first portion 325 and a second portion 335. The first portion 325 includes a first biasing member 327, and the second portion 335 includes a second biasing member 337. The first biasing member 327 and the second biasing member 337 secure or attach to an opening 350 in the lid 111. As shown in FIGS. 12A-12C, the first biasing member 327 and the second biasing member 337 may be squeezed inward (against their bias) and inserted into the opening 350 of the lid 111. Once fully inserted and released, the first biasing member 327 and the second biasing member 337 may flex outward to hold in the opening 350 of the lid 111. Barbs 329 and 339 of the first biasing member 327 and the second biasing member 337, respectively, may catch against indents 351 and 353 in the opening 350 to prevent withdrawal. A spring member 360, such as a coil spring, may bias against both an internal cavity 344 of the tie rod connection portion 340 and against inner walls 328 and 338 of the first portion 325 and the second portion 335, respectively. A shaft portion 346 of the tie rod connection portion 340 may fit into or engage an internal opening or passage of the lid connection assembly 320, which is jointly formed by the first portion 325 and the second portion 335.

Figure 13C:
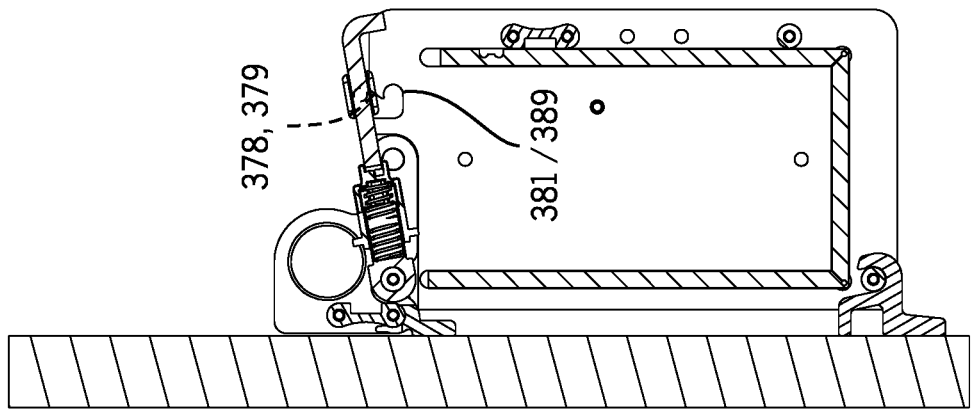
FIG. 13C is a side sectional view of the lid and hinge.
Figure 13B:
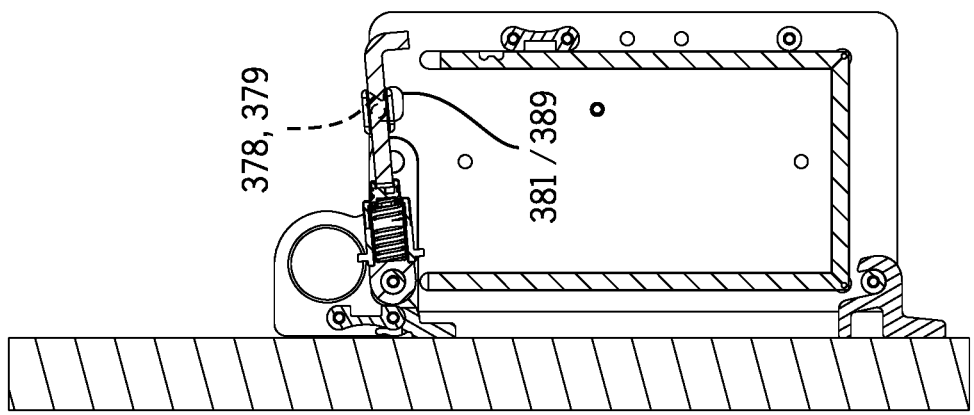
FIG. 13B is a side sectional view of the lid and hinge.
Figure 13A:
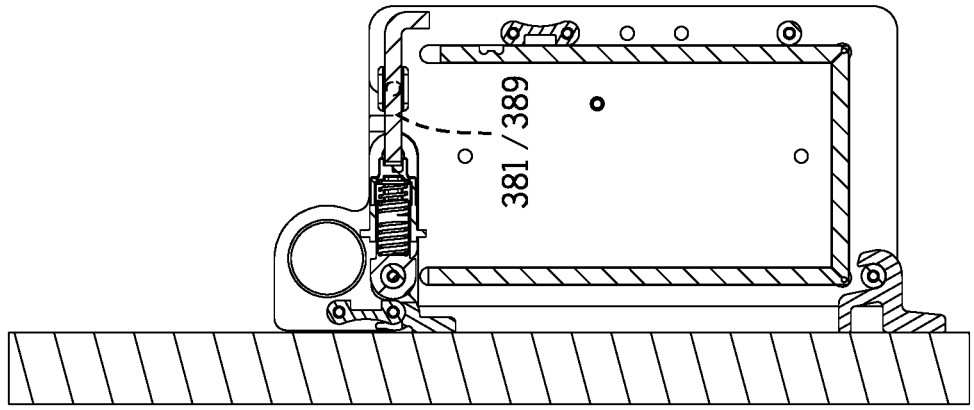
FIG. 13A is a side sectional view of the lid and hinge.
Figure 15B:
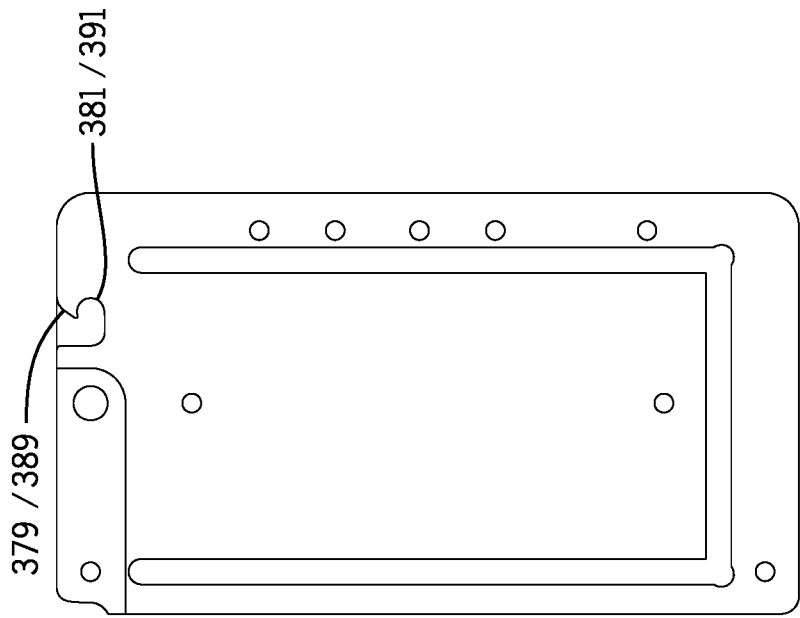
FIG. 15B is a side view of the box.
Figure 15A:
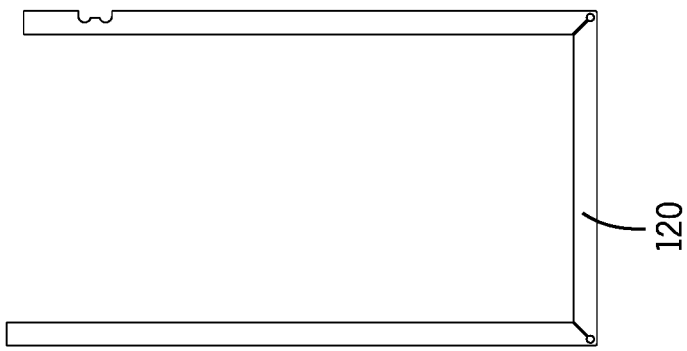
FIG. 15A is a side view of the box.
Figure 15C:
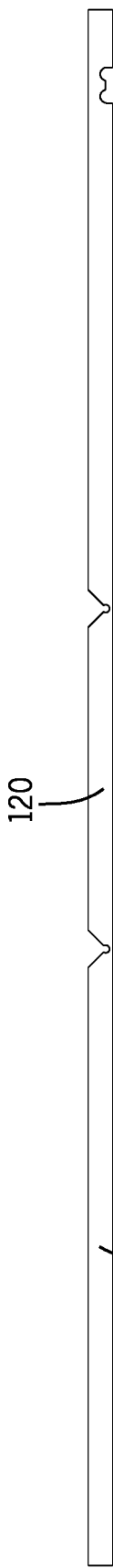
FIG. 15C is a side view of the material forming the box before bending.
Figure 16:
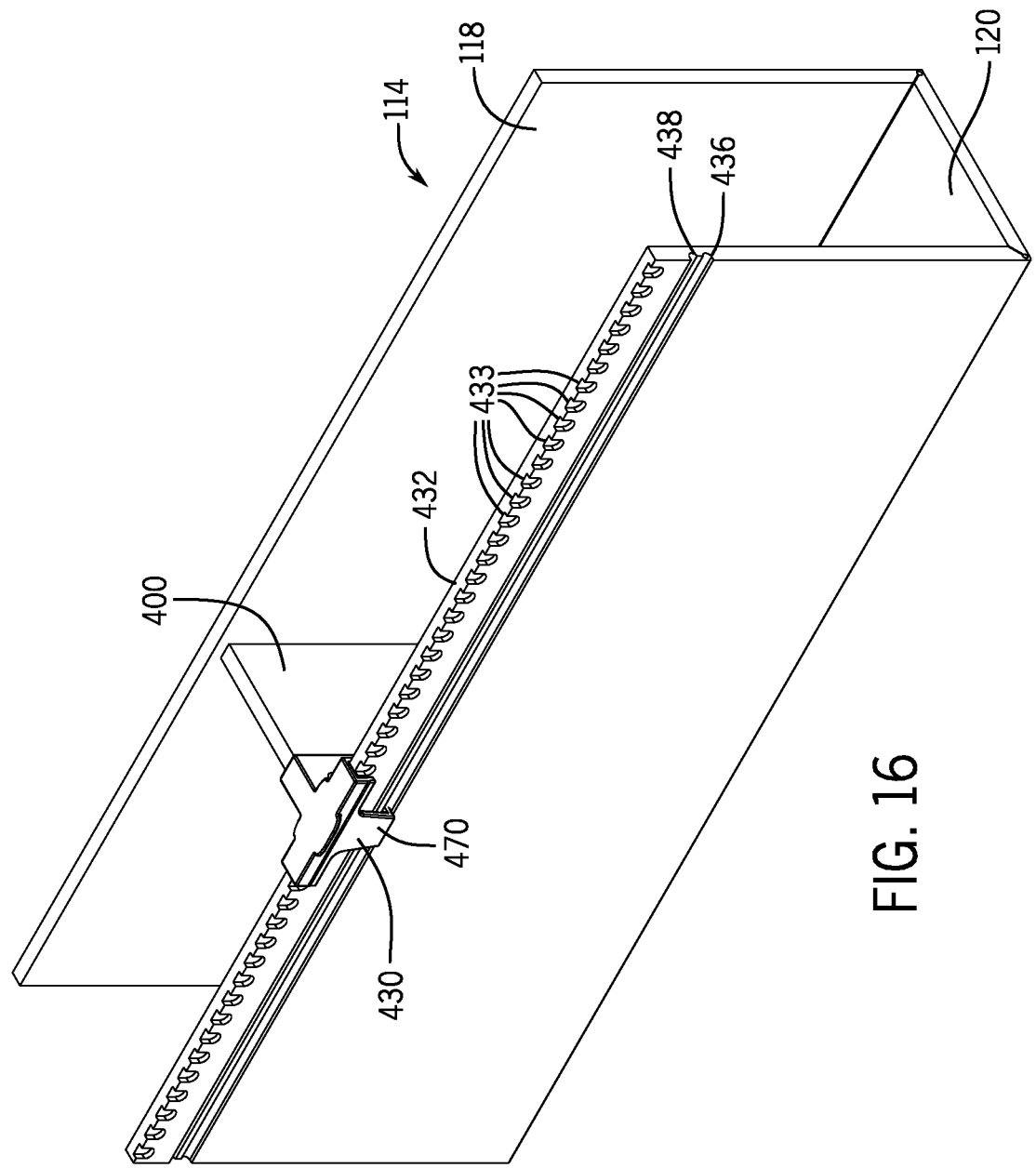
FIG. 16 is a perspective view of the box and divider wall.

With respect to FIGS. 10, 13, and 14, the lid pins 310 are shown. The lid pins 310 secure the lid 111 in a closed position covering the generally open interior 112 of the bin 110. The lid pins 310 extend from first and second lateral sides of the lid 111. The lid pins 310 extend generally parallel to a width of the bin 110. When the lid 111 is fully closed, the hinge assembly 300 biases or urges the lid 111 outward or forward, which traps the lid pins 310 in the openings 139 and 149 in the first lateral end block 130 and the second lateral end block 140. A combination of the openings 139 and 149 and the spring-loaded hinge provide a "push to latch" feature for closing the lid. As the lid 111 is moved downward, the lid pins 310 press against ramp portions 379 and 389 of the openings 139 and 149. The ramp portions 379 and 389 are angled downward toward a rear of the bin 110. As the lid pins 310 press against the ramp portions 379 and 389, the hinge assembly 300 contracts or shortens as the spring member 360 is compressed. Once the lid pins 310 pass ends of the ramp portions 379 and 389, the hinge assembly 300 extends and urges the lid pins 310 under the ramp portions 379 and 389 and into locking positions in grooves 381 and 391. The grooves 381 and 391 are under the ramp portions 379 and 389, which prevents the lid 111 from opening until the user presses or urges the lid 111 inward, thus again compressing the spring member 360, such that that lid pins 310 are out from under the ramp portions 378 and 389. As such, the lid 111 may be pushed to a closed position and automatically held in the closed position.

The upper bracket 500 and the lower bracket 550 mount to the wall 40 of the ambulance. The upper bracket 500 and the lower bracket 550 securely hold the bin 110 to the wall 40. The upper bracket 500 includes a generally upward-facing channel 510 and a generally forward-facing channel 520. The lower bracket 550 includes a generally upward-facing channel 560.

With respect to FIG. 9, the installation of the bin 110 to the upper bracket 500 and the lower bracket 550 is shown. The upper bracket 500 and the lower bracket 550 are secured to the walls 40 of the ambulance or other supporting structure. First, the second tie rod 155 is urged into the generally upward-facing channel 560 of the lower bracket 550. Next, the bin 110 is pivoted toward the upper bracket 500, and the first tie rod 150 is urged into the generally forward-facing channel 520 of the upper bracket 500. Next, the handle assembly 200 is moved toward the upper bracket 500 and to the locked configuration, and the lower rounded surface 224 of the support rod 220 is urged into the generally upward-facing channel 510. After the lower rounded surface 224 of the support rod 220 is positioned in the generally upward-facing channel 510, the bin 110 is locked to the upper bracket 500 and the lower bracket 550. Now, the bin 110 cannot generally be removed from the upper bracket 500 and the lower bracket 550 without first raising the handle assembly 200.

When the bin 110 is installed to the upper bracket 500 and the lower bracket 550, the lower bracket 550 supports the bin 110 and prevents downward movement of the bin 110. An outer wall 512 of the generally upward-facing channel 510 prevents outward movement of the bin 110. An inner wall 514 of the generally upward-facing channel 510 has a slight angle inward toward the channel 510 to hold the lower rounded surface 224. The upper wall 524 of the generally forward-facing channel 520 prevents upward movement of the bin 110. As such, the bin 110 is locked in place.

With respect to FIGS. 17-21, the interior 112 of the bin 110 may be divided or subdivided using one or more divider walls 400. This provides for an end-user to customize the bin 110 to their specific needs. The divider wall 400 may extend between the front portion 116 and the rear portion 118 of the bin 110. The divider wall 400 may be positioned generally perpendicular to the front portion 116 and the rear portion 118. The divider wall 400 may be adjusted in the generally open interior 112 laterally as preferred by the user. A positioner clip 430 is configured to slide relative to the front portion 116 of the bin 110. The positioner clip 430 is secured or attached to the divider wall 400. The user may pull up on the positioner clip 430 and/or the divider wall 400 and move them laterally. Once located, the positioner clip 430 will lock into place onto the front portion 116.

Figure 17B:
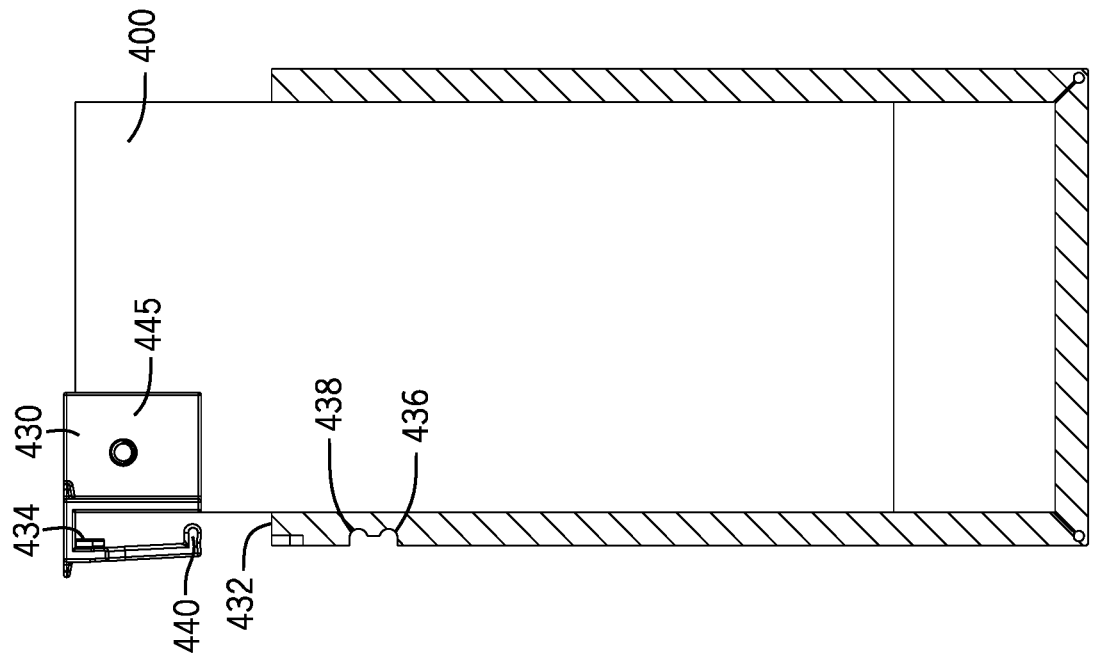
FIG. 17B is a side view of the box and divider wall.
Figure 17A:
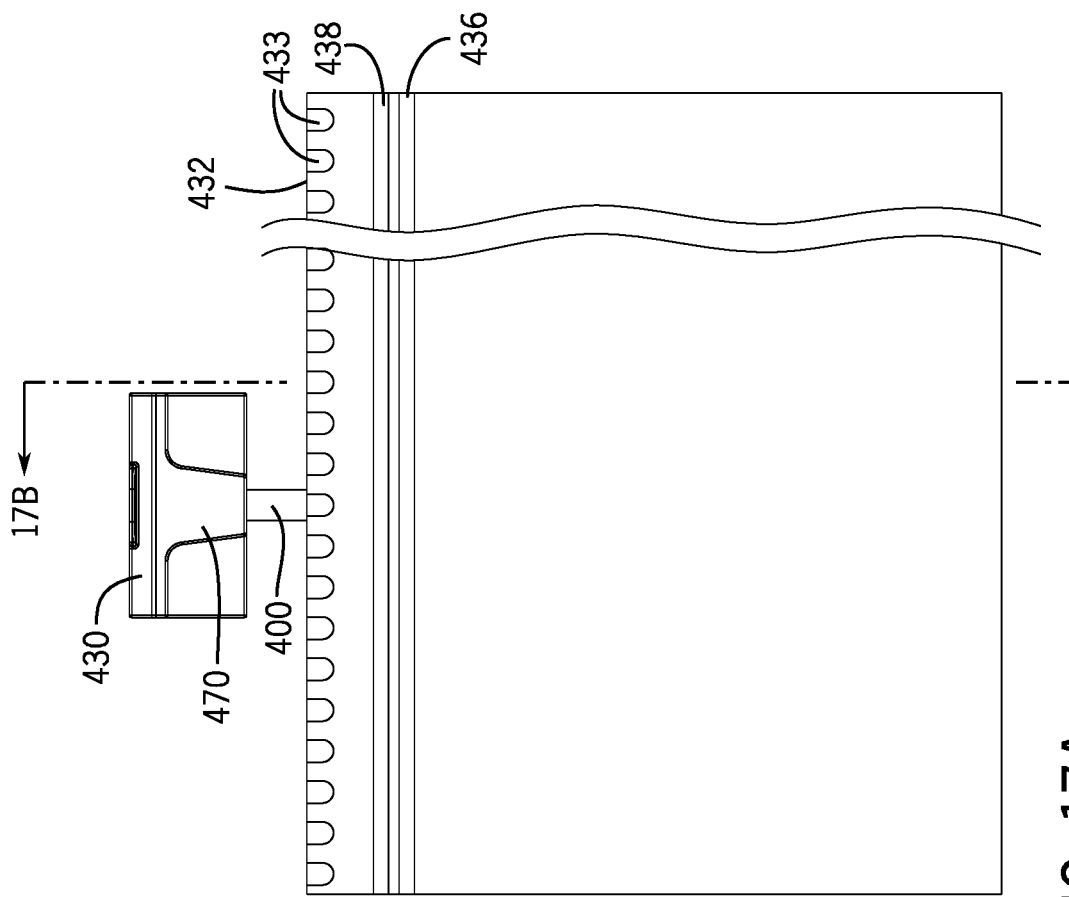
FIG. 17A is a front view of the box and divider wall.
Figure 18C:
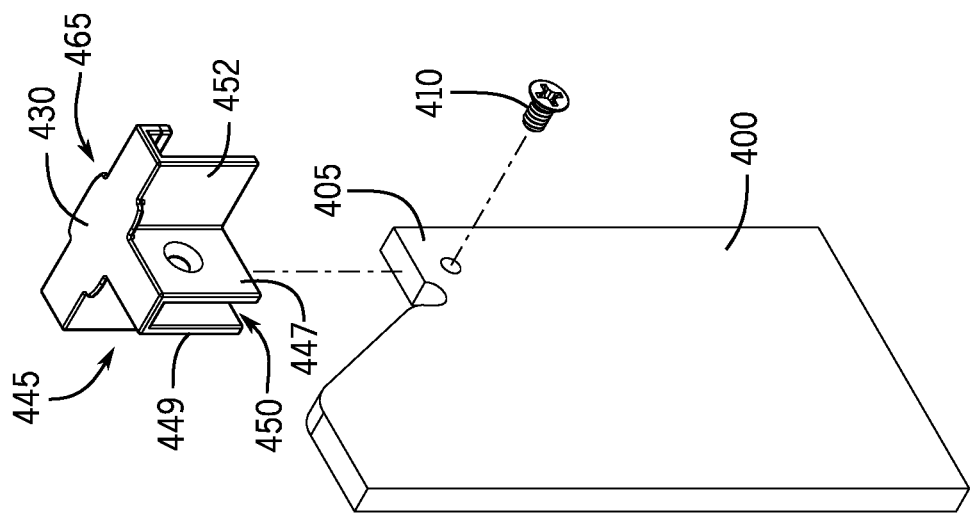
FIG. 18C is an exploded view of the divider wall and clip.
Figure 18B:
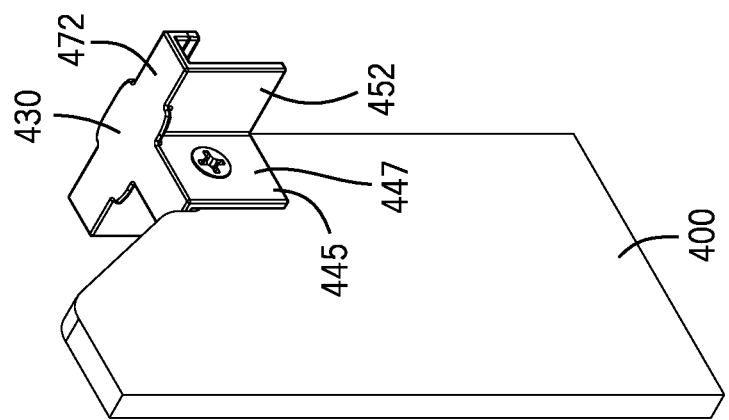
FIG. 18B is a perspective view of the divider wall and clip.
Figure 18A:
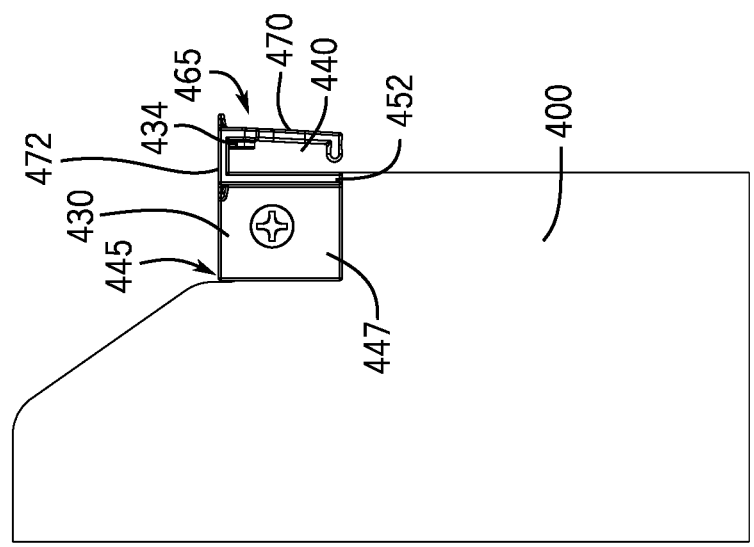
FIG. 18A is a side view of the divider wall and clip.

With respect to FIG. 17, an upper edge 432 of the front portion 116 includes a plurality of indents 433 that selectively receive a tab 434 of the positioner clip 430. In this aspect, the plurality of indents 433 are formed in an outer surface of the upper edge 432 of the front portion 116. The tab 434 locks into place in one of the plurality of indents 433 to hold the positioner clip 430, and thus, the divider wall 400, in a fixed position relative to the interior 112 of the bin 110.

The upper edge 432 further includes a first groove 436 and a second groove 438. The first groove 436 is generally below the second groove 438. The first groove 436 and the second groove 438 generally extend a length or width of the bin 110. A detent portion 440 of the positioner clip 430 is generally held in either of the first groove 436 or the second groove 438. The detent portion 440 is held in the first groove 436 when the tab 434 is locked or settled in place in one of the indents 433. When the user wishes to adjust the position of the divider wall 400, the user pulls up on the positioner clip 430 and/or divider wall 400 to pull the detent portion 440 from the first groove 436 and into the second groove 438. With the detent portion 440 in the second groove 438, the tab 434 is free from the indents 433, and now the positioner clip 430 may be moved in lateral position relative to the upper edge 432. When the desired location of the divider wall 400 is achieved, the user may press down on the on the positioner clip 430 and/or divider wall 400 to urge the detent portion 440 from the second groove 438 into the first groove 436 and the tab 434 into one of the indents 433. With the tab 434 settled into one of the indents 433, the positioner clip 430 is now fixed in position relative to the bin 110.

Figure 19C:
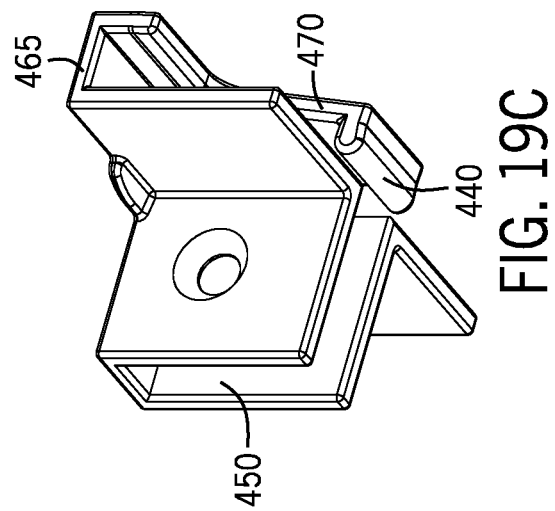
FIG. 19C is a perspective view of the clip.
Figure 19B:
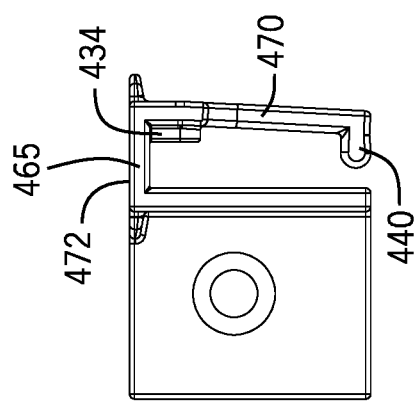
FIG. 19B is a side view of the clip.
Figure 19A:
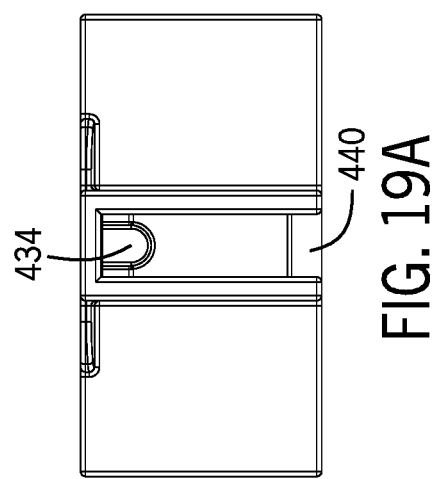
FIG. 19A is a front view of the clip.
Figure 20B:
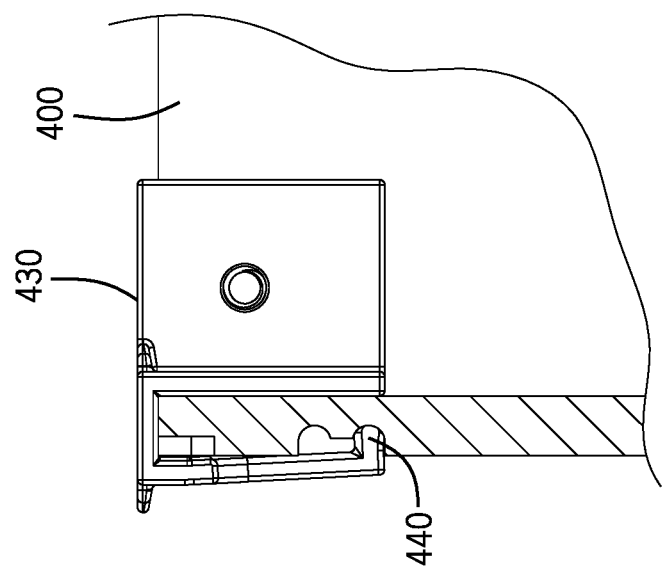
FIG. 20B is a view of the divider wall and clip.
Figure 20A:
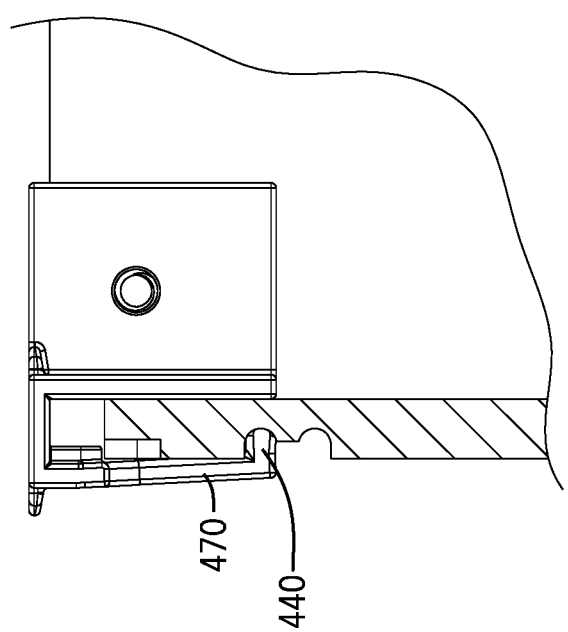
FIG. 20A is a view of the divider wall and clip.

With respect to FIGS. 19 and 20, the positioner clip 430 will be described. The positioner clip 430 includes a divider wall connection portion 445 and a front wall engagement portion 465. In this aspect, the divider wall connection portion 445 is integral with the front wall engagement portion 465. The divider wall connection portion 445 include a first lateral wall 447 and second lateral wall 449 separated by a gap 450. A corner 405 of the divider wall 400 fits into the gap 450. A fastener 410 may pass through the first lateral wall 447, the corner 405 of the divider wall 400, and the second lateral wall 449 to secure the positioner clip 430 to the divider wall 400.

The first lateral wall 447 and the second lateral wall 449 extend generally perpendicular from a central wall 452 of the positioner clip 430. Opposite of the first lateral wall 447 and the second lateral wall 449, the front wall engagement portion 465 extends from the central wall 452. The front wall engagement portion 465 include a biasing portion 470 that extends downward from an upper wall 472 of the front wall engagement portion 465. In this aspect, the upper wall 472 is integral with the central wall 452. The biasing portion 470 is generally parallel to the central wall 452. The biasing portion 470 includes both the tab 434 and the detent portion 440. The tab 434 is positioned on an inner surface 474 of the biasing portion 470 proximal the upper wall 472. The detent portion 440 is positioned on the inner surface 474 distal from the upper wall 472. As such, the detent portion 440 is positioned on the inner surface 474 below the tab 434. In this aspect, the detent portion 440 extends inwardly a greater distance than the tab 434.

The biasing portion 470 is configured to be pulled or bent outward such that the positioner clip 430 may be lifted to move the detent portion 440 from the first groove to the second groove 438 for the positioner clip 430 to be moved laterally. When released, the biasing portion 470 will resiliently return to its resting position, which draws the detent portion 440 inward. The depth of the second groove 438 is configured to prevent accidental removal of the positioner clip 430 from upper edge 432.

In this aspect, as shown in FIGS. 24A-24C, a protrusion 590 extends from an upper surface 595 of the lid connection assembly 320 of the hinge assembly 300. The protrusion 590 interacts with a recess 250 of the handle assembly 200 to hold the lid 111 in an upright or open position. The recess 250 may be formed in a lower or inner surface of the support rod 220. The engagement of the protrusion 590 to the recess 250 holds the lid 111 in this upright or open position. In order to move the lid 111 to the holding position, the user depresses the lid 111, rotates the lid 111 toward the wall 40, and releases the lid 111. The spring member 360 then extends/biases the protrusion 590 into or against the recess 250 of the handle assembly 200, and this engagement holds the lid 110 in the open position. In order to close the lid 111, the user simply pulls on the lid 111 and the protrusion 590 slides out of the recess 250. In certain aspect, the protrusion 590 may include a square or rectangular knob portion that interacts with an interior corner surface of the recess 250. In certain aspect, the protrusion 590 frictionally engages with the recess 250 to hold the lid 111 in the open position. The protrusion 590 may be made from a flexibly resilient material that deforms to fit into or out of the recess 250. In other aspects, the 250 may include an opening in the handle assembly 200 or the support rod 220 that removably receives the protrusion 590.

Figure 21:
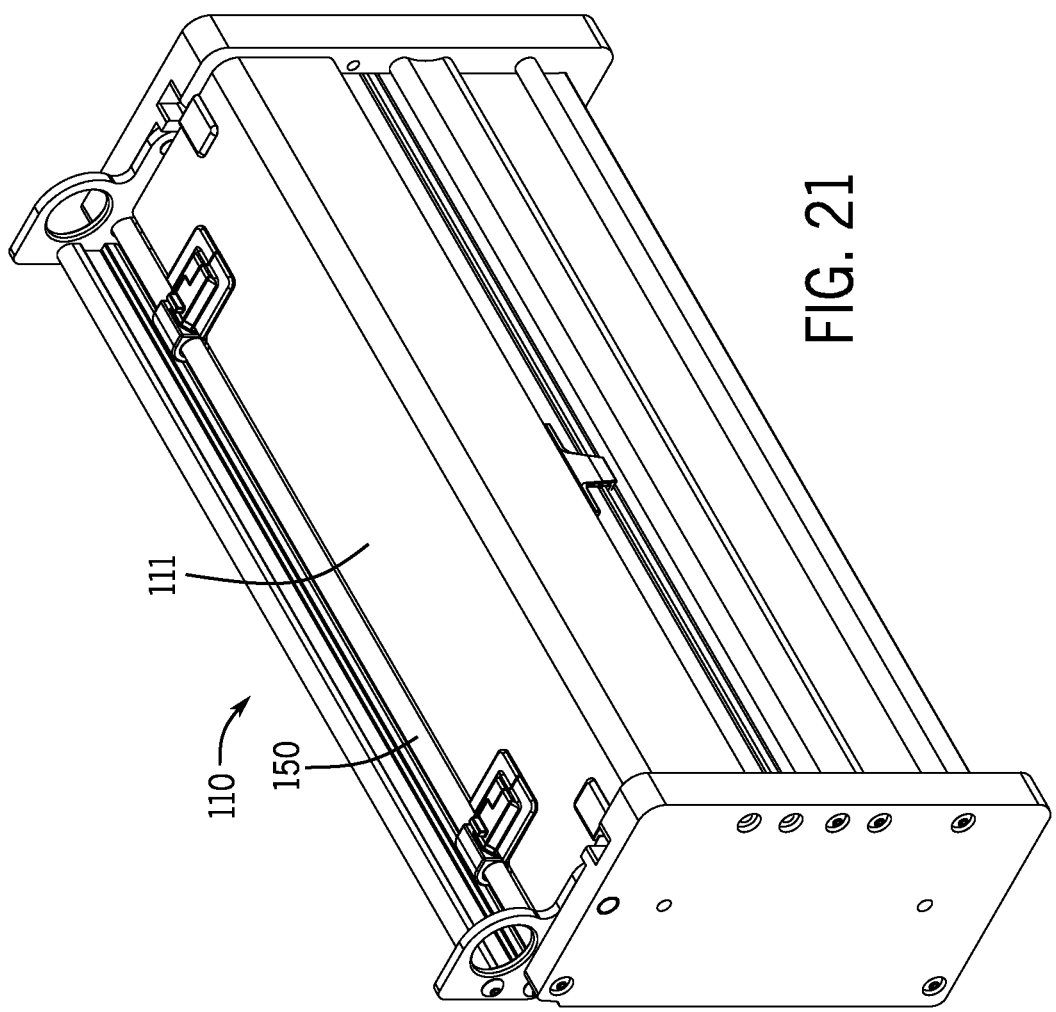
FIG. 21 is a perspective view of the bin with the alternate lid.
Figure 22:
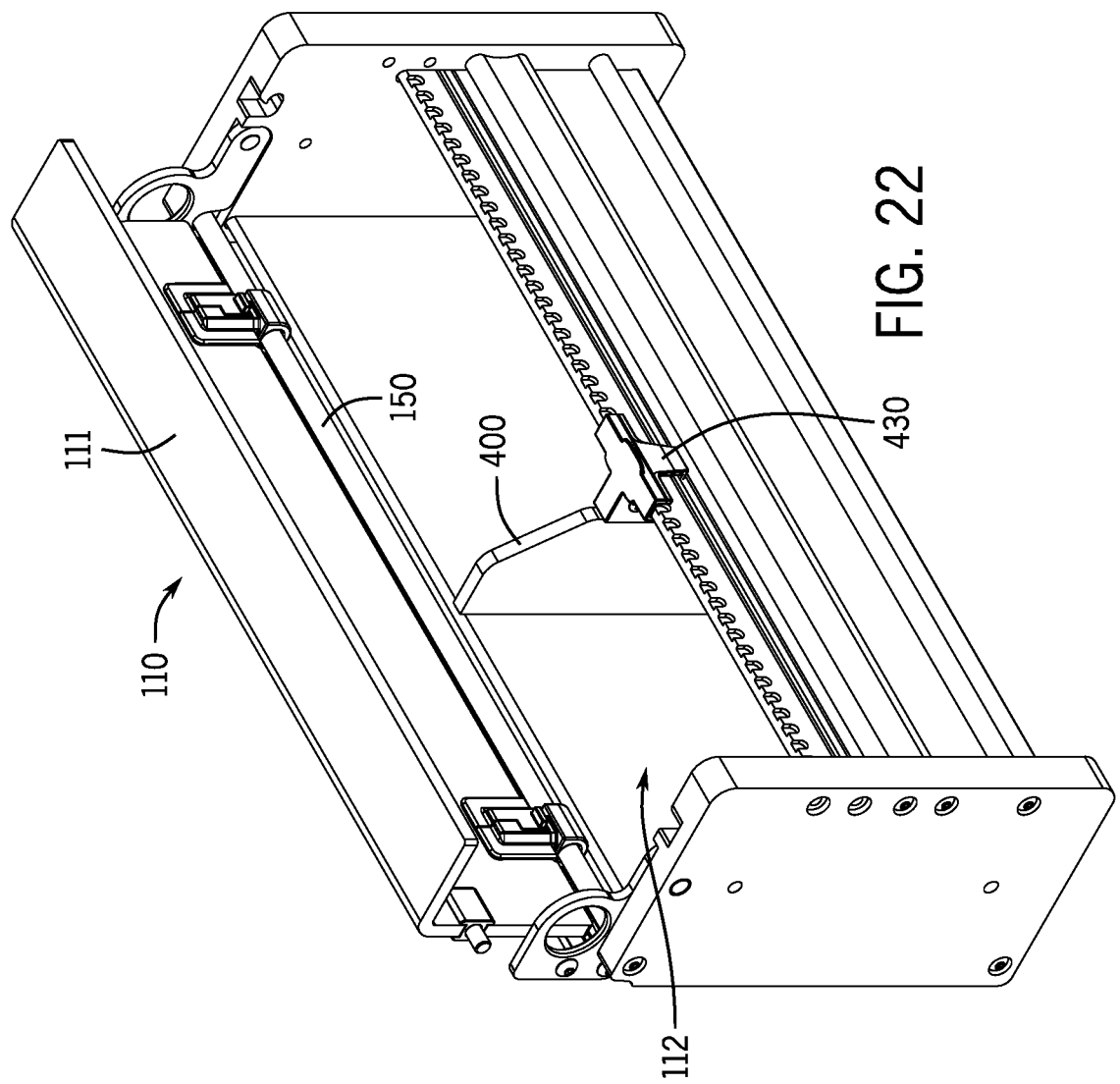
FIG. 22 is a perspective view of the bin with the alternate lid in the open position.
Figure 23A:
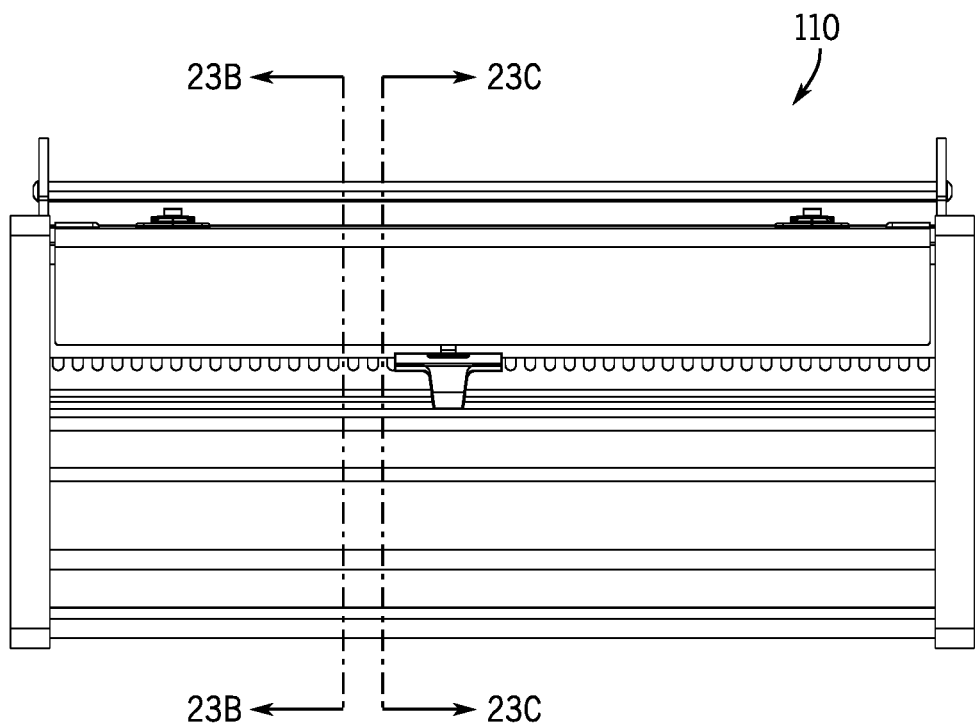
FIG. 23A is a view of the bin with the alternate lid.
Figure 23B:
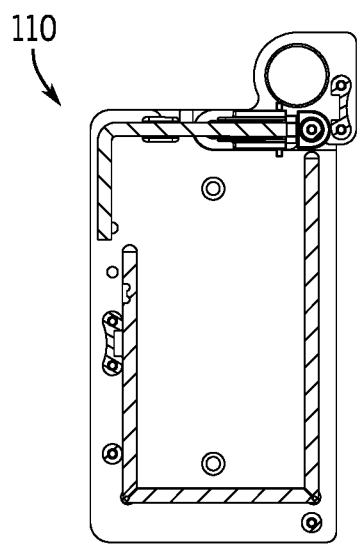
FIG. 23B is a view of the bin with the alternate lid.
Figure 23C:
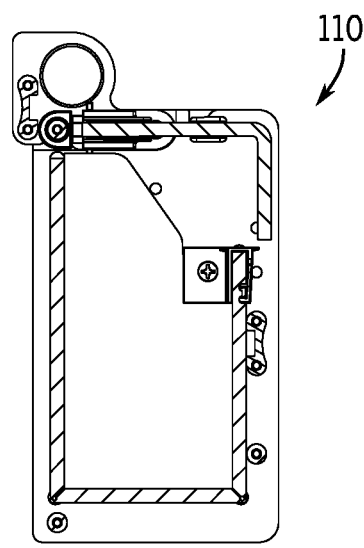
FIG. 23C is a view of the bin with the alternate lid.

With respect to FIGS. 21-23, the front portion 113 of the lid 111 may include a bend or an angled portion that leads into an extended front portion. In this aspect, the front portion 113 bends or angles downward from a remainder of the lid 111 and covers a portion of a front side of the bin 110. This provides the user a gripping surface in order to raise the lid 111. In other aspects, an additional handle portion or knob may be attached or integral with the front portion 113 to provide the gripping surface. For example, a handle may be fitted to an edge of the front portion 113

The bin 110 may be readily removed from the wall 40 of an ambulance. This provides for convenient restocking or replacement with a second bin 110. The user may readily remove the bin 110 and carry it to a supply room for restocking, or the user may simply grab another pre-stocked bin 110. Individual users may maintain their own bins 110 stocked with their preferred supplies.

The bin 110 is securely mounted to the wall 40 and is configured to hold large and/or heavy equipment, such as defibrillators and other medical equipment. Instead of strapping the individual defibrillator to the wall 40 of the ambulance, the use may simply drop the defibrillator in the bin 110. The bin system 100 may replace current wall mounts for certain medical equipment.

In other aspects, lateral rods may be positioned on a rear surface of the bin 110. The lateral rods engage the upper bracket 500 and the lower bracket 550 to hold the bin 110. The lateral rods may be separate components from the bin 110. The lateral rods may replace the tie rods 150, 155, 160, and 165. The lateral rods may not hold the bin 110 together. The bin 110 may be constructed with conventional techniques. The lateral rods are fastened or attached to the bin 110. The lateral rods may extend less than a length or width of the bin 110.

As such, it should be understood that the disclosure is not limited to the particular aspects described herein, but that various changes and modifications may be made without departing from the spirit and scope of this novel concept as defined by the following claims. Further, many other advantages of applicant's disclosure will be apparent to those skilled in the art from the above descriptions and the claims below.

What is claimed is:

1. A bin system, comprising:
a bin, the bin comprising a box portion, a first lateral end block, and a second lateral end block;
a handle assembly rotatably engaged to the bin;
the bin comprising a first tie rod and a second tie rod;
the first tie rod and the second tie rod secure the box portion, the first lateral end block, and the second lateral end block together;
an upper bracket;
a lower bracket;
the second tie rod configured to engage to the lower bracket;
the first tie rod configured to engage to the upper bracket;
and the handle assembly configured to engage to the upper bracket.

2. The bin system according to claim 1, wherein the handle assembly comprises a locked configuration and a carry configuration, and the handle assembly rotates between the locked configuration and the carry configuration.

3. The bin system according to claim 2, wherein, a portion of a handle of the handle assembly is configured to secure to the upper bracket.

4. The bin system according to claim 2, wherein the lower bracket comprises a generally upward-facing channel, and the upper bracket comprises a generally forward-facing channel and a generally upward-facing channel.

5. The bin system according to claim 4, wherein, when the handle assembly is in the locked configuration, the second tie rod positioned in the generally upward-facing channel of the lower bracket, the first tie rod is positioned in the generally forward-facing channel of the upper bracket, and a support rod of the handle assembly is positioned in the generally upward-facing channel of the upper bracket.

6. The bin system according to claim 2, wherein when the handle assembly is in the locked configuration, the bin is non-removable from the upper bracket and the lower bracket.

7. The bin system according to claim 1, wherein the box portion includes a front portion, a rear portion, and a bottom portion, wherein the front portion, the rear portion, and the bottom portion are integral.

8. The bin system according to claim 1, wherein a lid for the bin hingedly engages to the first tie rod.

9. A bin system, comprising:
a bin;
a handle assembly rotatably engaged to the bin;
the bin comprising a first tie rod and a second tie rod;
an upper bracket;
a lower bracket;
the second tie rod configured to engage to the lower bracket;
the first tie rod configured to engage to the upper bracket;
the handle assembly configured to engage to the upper bracket; and
wherein a lid for the bin hingedly engages to the bin via a spring-loaded hinge, and wherein the spring-loaded hinge biases or urges the lid outward or forward.

10. The bin system according to claim 9, wherein the lid comprises lid pins, wherein in a closed configuration of the lid, the lid pins are held in openings in lateral walls of the bin.

11. The bin system according to claim 9, wherein the spring-loaded hinge includes a lid connection assembly and a tie rod connection portion, and the lid connection assembly connects or attaches to the lid, and the tie rod connection portion connects or attaches to the first tie rod, wherein the lid connection assembly includes a first portion and a second portion, the first portion includes a first biasing member, and the second portion includes a second biasing member, and the first biasing member and the second biasing member secure or engage to an opening in the lid.

12. The bin system according to claim 9, wherein, when the lid is in a closed configuration, the spring-loaded hinge biases or urges the lid outward or forward, which traps lid pins in openings in a first lateral end block and a second lateral end block.

13. A bin system, comprising:
a bin;
a handle assembly rotatably engaged to the bin;
the bin comprising a first tie rod and a second tie rod;
an upper bracket;
a lower bracket;
the second tie rod configured to engage to the lower bracket;
the first tie rod configured to engage to the upper bracket;
the handle assembly configured to engage to the upper bracket; and
wherein the bin comprises:
a box portion;
a first lateral end block;
a second lateral end block;
a first groove is formed in an interior surface of the first lateral end block, and the first groove receives a first lateral side of the box portion;
and a second groove is formed in an interior surface of the second lateral end block, and the second groove receives a second lateral side of the box portion.

14. The bin according to claim 13, wherein the box portion comprises a front portion, a rear portion, and a bottom portion, and lateral edges of the front portion, the rear portion and the bottom portion are configured to insert or fit into the first groove and the second groove.

15. A bin system, comprising:
a bin;
a handle assembly rotatably engaged to the bin;
the bin comprising a first lateral rod and a second lateral rod, the first lateral rod and the second lateral rod positioned on a rear portion of the bin;
an upper bracket;
a lower bracket;
the second lateral rod configured to engage to the lower bracket;
the first lateral rod configured to engage to the upper bracket;
the handle assembly configured to engage to the upper bracket;
and wherein handle assembly comprises a locked configuration and a carry configuration, and the handle assembly rotates between the locked configuration and the carry configuration, wherein, when the handle assembly is in the locked configuration, a portion of the handle assembly secures to an upward-facing channel of the upper bracket.

16. The bin system according to claim 15, wherein the handle assembly is configured to rotate over a top of the bin and toward the rear portion of the bin to engage the upper bracket.

17. The bin system according to claim 15, wherein the first lateral rod is positioned on a rear of an upper portion of the bin, and the second lateral rod is positioned on a rear of a lower portion of the bin.

18. A bin system, comprising:
a bin;
a handle assembly rotatably engaged to the bin;
the bin comprising a first tie rod and a second tie rod;
an upper bracket;
a lower bracket;
the second tie rod configured to engage to the lower bracket;
the first tie rod configured to engage to the upper bracket; and,
the handle assembly configured to rotate over a top of the bin and toward a rear of the bin to engage the upper bracket.

19. The bin system according to claim 18, wherein a portion of the handle assembly is configured to fit into an upward-facing channel of the upper bracket.

20. The bin system according to claim 18, wherein the handle assembly comprises a first arm and a second arm, wherein the first arm includes a first opening or indent, and wherein the second arm includes a second opening or indent, and wherein the first opening or indent of the first arm is configured to engage to the first tie rod, and wherein the second opening or indent of the second arm is configured to engage to the first tie rod.

* * * * *